US012171293B2

(12) United States Patent
Waters

(10) Patent No.: US 12,171,293 B2
(45) Date of Patent: Dec. 24, 2024

(54) LIGHTED HEADGEAR AND ACCESSORIES THEREFOR

(71) Applicant: Waters Industries, Inc., West Dundee, IL (US)

(72) Inventor: Michael Waters, Aspen, CO (US)

(73) Assignee: Waters Industries, Inc., West Dundee, IL (US)

( * ) Notice: Subject to any disclaimer, the term of this patent is extended or adjusted under 35 U.S.C. 154(b) by 0 days.

(21) Appl. No.: 17/562,765

(22) Filed: Dec. 27, 2021

(65) Prior Publication Data

US 2023/0200478 A1 Jun. 29, 2023

(51) Int. Cl.

| | |
|---|---|
| ***A42B 1/244*** | (2021.01) |
| ***A42B 3/04*** | (2006.01) |
| ***F21L 4/02*** | (2006.01) |
| ***F21L 4/08*** | (2006.01) |
| ***F21V 21/084*** | (2006.01) |
| ***F21V 21/088*** | (2006.01) |
| ***F21V 33/00*** | (2006.01) |
| ***F21Y 115/10*** | (2016.01) |

(52) U.S. Cl.

CPC .............. *A42B 1/244* (2013.01); *A42B 3/044* (2013.01); *F21L 4/027* (2013.01); *F21L 4/08* (2013.01); *F21V 21/084* (2013.01); *F21V 21/0885* (2013.01); *F21V 33/0008* (2013.01); *F21Y 2115/10* (2016.08)

(58) Field of Classification Search

CPC ...... A42B 1/244; A42B 1/242; F21V 33/0008

See application file for complete search history.

(56) References Cited

U.S. PATENT DOCUMENTS

| | | | |
|---|---|---|---|
| 645,984 | A | 3/1900 | Tournier |
| 909,742 | A | 1/1909 | Borchert |
| 1,098,628 | A | 6/1914 | Hyman |
| 1,109,415 | A | 9/1914 | Harris |
| 1,255,265 | A | 2/1918 | Zachara |
| 1,261,824 | A | 4/1918 | La Vine |
| 1,323,822 | A | 12/1919 | Bramming |
| D58,302 | S | 7/1921 | Bartholomew |
| 1,438,586 | A | 12/1922 | Eaton |
| 1,448,353 | A | 3/1923 | Barany |
| 1,475,653 | A | 11/1923 | Rosenberg |

(Continued)

FOREIGN PATENT DOCUMENTS

| | | |
|---|---|---|
| AU | 1178576 | 9/1977 |
| AU | 6310994 | 11/1994 |

(Continued)

OTHER PUBLICATIONS

Docket report of *Waters Industries, Inc.* v. *Totes Isotoner Corporation, et al.*, United States District Court for the Northern District of Illinois, Case No. 1:10-cv-04487 filed Jul. 19, 2010 (4 pages).

(Continued)

*Primary Examiner* — William N Harris
(74) *Attorney, Agent, or Firm* — Fitch, Even, Tabin & Flannery LLP

(57) ABSTRACT

There is provided lighted headgear having various configurations, components thereof, and other accessories combined therewith. Also provided are accessories including light modules for use with headgear, clothing, or the like.

6 Claims, 15 Drawing Sheets

(56) References Cited

U.S. PATENT DOCUMENTS

| | | | |
|---|---|---|---|
| 1,572,210 | A | 2/1926 | Kolibas |
| 1,615,067 | A | 1/1927 | Boerman |
| 1,744,777 | A | 1/1930 | Lundgren |
| 1,749,998 | A | 3/1930 | Collins |
| 1,879,512 | A | 9/1932 | Rotea |
| 1,883,756 | A | 10/1932 | Bloom |
| D114,980 | S | 1/1939 | Wengen |
| 2,196,543 | A | 4/1940 | Anderson |
| 2,234,995 | A | 3/1941 | Waechter |
| 2,373,553 | A | 10/1942 | Fetterman |
| D137,375 | S | 2/1944 | Heit |
| 2,369,829 | A | 2/1945 | Johnson |
| 2,461,254 | A | 2/1949 | Bassett |
| 2,473,394 | A | 6/1949 | Scott |
| 2,531,585 | A | 11/1950 | Pope |
| 2,540,435 | A | 2/1951 | Ferguson |
| 2,552,764 | A | 5/1951 | Bedford, Jr. |
| 2,567,046 | A | 9/1951 | Anderson |
| 2,591,112 | A | 4/1952 | Zwierzynski |
| 2,638,532 | A | 5/1953 | Brady |
| 2,640,980 | A | 6/1953 | Prupis |
| 2,705,751 | A | 4/1955 | Harris |
| 2,730,720 | A | 1/1956 | Saunders |
| 2,788,439 | A | 4/1957 | Hesse |
| 2,904,670 | A | 9/1959 | Calmes |
| 2,966,580 | A | 12/1960 | Taylor |
| 2,978,696 | A | 4/1961 | Keller |
| 3,008,040 | A | 11/1961 | Moore |
| 3,032,647 | A | 5/1962 | Wansky |
| 3,040,881 | A | 6/1962 | McNeill |
| 3,057,992 | A | 10/1962 | Baker |
| 3,060,308 | A | 10/1962 | Fortuna |
| 3,123,208 | A | 3/1964 | Barnum et al. |
| 3,184,058 | A | 5/1965 | Crowther |
| 3,201,771 | A | 8/1965 | Proulx |
| D207,919 | S | 6/1967 | Fai |
| 3,350,552 | A | 10/1967 | Lawrence |
| 3,358,137 | A | 12/1967 | Sinclair |
| 3,447,164 | A | 6/1969 | Greenhouse |
| D215,751 | S | 10/1969 | Castellano |
| 3,491,374 | A | 1/1970 | Frangos |
| 3,535,282 | A | 10/1970 | Mallory |
| 3,537,909 | A | 11/1970 | Horton |
| 3,602,759 | A | 8/1971 | Evans |
| 3,634,676 | A | 1/1972 | Castellano |
| 3,647,059 | A | 3/1972 | Humphreys |
| 3,666,901 | A | 5/1972 | Weinhart |
| 3,683,168 | A | 8/1972 | Tatje |
| 3,740,545 | A | 6/1973 | Franklin |
| 3,749,902 | A | 7/1973 | Drew |
| 3,769,663 | A | 11/1973 | Perl |
| D229,975 | S | 1/1974 | Klugmann |
| 3,793,517 | A | 2/1974 | Carlini |
| 3,845,389 | A | 10/1974 | Phillips |
| 3,947,676 | A | 3/1976 | Battilana |
| 3,963,917 | A | 6/1976 | Romano |
| 4,005,776 | A | 2/1977 | Seeley |
| 4,011,600 | A | 3/1977 | Malk |
| 4,053,688 | A | 10/1977 | Perkins |
| 4,092,704 | A | 5/1978 | Malm |
| 4,176,932 | A | 12/1979 | Young et al. |
| 4,186,429 | A | 1/1980 | Johnston |
| 4,210,952 | A | 7/1980 | Ressmeyer |
| 4,231,079 | A | 10/1980 | Heminover |
| 4,254,451 | A | 3/1981 | Cochran, Jr. |
| 4,268,894 | A | 5/1981 | Bartunek |
| 4,270,227 | A | 6/1981 | Wolfe |
| 4,283,127 | A | 8/1981 | Rosenwinkel et al. |
| 4,298,913 | A | 11/1981 | Lozar |
| 4,317,162 | A | 2/1982 | Richards et al. |
| 4,332,007 | A | 5/1982 | Gibstein et al. |
| 4,364,107 | A | 12/1982 | Wieczorek |
| 4,392,183 | A | 7/1983 | Ostlund et al. |
| 4,398,237 | A | 8/1983 | Doyel |
| 4,406,040 | A | 9/1983 | Cannone |
| 4,425,531 | A | 1/1984 | Holmes |
| D272,733 | S | 2/1984 | Cosmos |
| 4,430,532 | A | 2/1984 | Matsumoto |
| 4,442,478 | A | 4/1984 | Stansbury |
| 4,462,064 | A | 7/1984 | Schweitzer |
| 4,470,263 | A | 9/1984 | Lehovec |
| 4,483,021 | A | 11/1984 | McCall |
| 4,516,157 | A | 5/1985 | Campbell |
| 4,521,831 | A | 6/1985 | Thayer |
| 4,541,698 | A | 9/1985 | Lerner |
| 4,551,857 | A | 11/1985 | Galvin |
| 4,553,851 | A | 11/1985 | Matsumoto |
| 4,559,516 | A | 12/1985 | Schott |
| 4,570,206 | A | 2/1986 | Deutsch |
| 4,602,191 | A | 7/1986 | Davila |
| 4,604,760 | A | 8/1986 | Coin |
| 4,616,297 | A | 10/1986 | Liu |
| 4,631,644 | A | 12/1986 | Dannhauer |
| 4,638,410 | A | 1/1987 | Barker |
| 4,641,647 | A | 2/1987 | Behan |
| 4,642,817 | A | 2/1987 | Ferstenfeld |
| 4,665,568 | A | 5/1987 | Stutes |
| 4,667,274 | A | 5/1987 | Daniel |
| 4,669,610 | A | 6/1987 | Lindsey |
| 4,680,815 | A | 7/1987 | Hirsch |
| 4,774,643 | A | 9/1988 | McGinnis et al. |
| 4,794,496 | A | 12/1988 | Lanes |
| 4,817,212 | A | 4/1989 | Benoit |
| 4,822,160 | A | 4/1989 | Tsai |
| 4,822,161 | A | 4/1989 | Jimmy |
| 4,827,384 | A | 5/1989 | Vonschlemmer |
| 4,829,285 | A | 5/1989 | Brand et al. |
| 4,872,218 | A | 10/1989 | Holt |
| 4,875,147 | A | 10/1989 | Auer |
| 4,884,067 | A | 11/1989 | Nordholm et al. |
| 4,901,210 | A | 2/1990 | Hanabusa |
| 4,901,211 | A | 2/1990 | Shen |
| 4,902,119 | A | 2/1990 | Porsche |
| 4,904,078 | A | 2/1990 | Gorike |
| 4,920,466 | A | 4/1990 | Liu |
| 4,945,458 | A | 7/1990 | Batts et al. |
| 4,951,068 | A | 8/1990 | Ichikawa |
| 4,959,760 | A | 9/1990 | Wu |
| 4,963,045 | A | 10/1990 | Willcox |
| 4,969,069 | A | 11/1990 | Eichost |
| 4,991,068 | A | 2/1991 | Mickey |
| 4,998,187 | A | 3/1991 | Herrick |
| 5,003,640 | A | 4/1991 | Pizzacar |
| D316,932 | S | 5/1991 | Escher, Jr. |
| 5,039,829 | A | 8/1991 | Brucksch |
| 5,060,814 | A | 10/1991 | Oglesbee |
| 5,068,771 | A | 11/1991 | Savage, Jr. |
| 5,070,436 | A | 12/1991 | Alexander et al. |
| 5,088,127 | A | 2/1992 | Thornock |
| 5,111,366 | A | 5/1992 | Rife |
| 5,113,325 | A | 5/1992 | Eisenbraun |
| 5,117,510 | A | 6/1992 | Broussard et al. |
| 5,122,943 | A | 6/1992 | Pugh |
| 5,138,538 | A | 8/1992 | Sperling |
| 5,140,116 | A | 8/1992 | Schmitt-Walter |
| 5,140,220 | A | 8/1992 | Hasegawa |
| 5,143,443 | A | 9/1992 | Madsen |
| 5,158,356 | A | 10/1992 | Guthrie |
| 5,163,420 | A | 11/1992 | Vanderbel |
| 5,164,749 | A | 11/1992 | Shelton |
| 5,165,789 | A | 11/1992 | Womack |
| 5,183,326 | A | 2/1993 | Case |
| 5,189,512 | A | 2/1993 | Cameron et al. |
| 5,193,220 | A | 3/1993 | Ichinohe |
| 5,193,347 | A | 3/1993 | Apisdorf |
| 5,207,500 | A | 5/1993 | Rios et al. |
| 5,218,385 | A | 6/1993 | Lii |
| 5,224,772 | A | 7/1993 | Fustos |
| 5,230,558 | A | 7/1993 | Jong |
| 5,238,344 | A | 8/1993 | Nagayama |
| 5,245,516 | A | 9/1993 | De Haas et al. |
| 5,249,675 | A | 10/1993 | Strauss |
| D343,470 | S | 1/1994 | Yuen |
| 5,278,734 | A | 1/1994 | Ferber |

(56) References Cited

U.S. PATENT DOCUMENTS

D349,123 S 7/1994 Cooley
5,329,637 A 7/1994 Walker
5,331,333 A 7/1994 Tagawa et al.
5,331,357 A 7/1994 Cooley et al.
5,353,205 A 10/1994 Hudak
5,357,409 A 10/1994 Glatt
5,363,291 A 11/1994 Steiner
5,367,345 A 11/1994 Da Silva
5,404,593 A 4/1995 Kronenberger
5,408,393 A 4/1995 Becker
5,410,746 A 4/1995 Gelber
5,412,545 A 5/1995 Rising
5,418,565 A 5/1995 Smith
5,423,419 A 6/1995 Wentz
5,425,620 A 6/1995 Stroud
5,438,698 A 8/1995 Burton et al.
5,452,190 A 9/1995 Priesemuth
5,460,346 A 10/1995 Hirsch
5,463,538 A 10/1995 Womack
5,467,992 A 11/1995 Harkness
5,485,358 A 1/1996 Chien
5,488,361 A 1/1996 Perry
5,503,637 A 4/1996 Kyricos
5,508,900 A 4/1996 Norman
5,510,961 A 4/1996 Peng
5,541,767 A 7/1996 Murphy et al.
5,541,816 A 7/1996 Miserendino
5,542,627 A 8/1996 Crenshaw
5,546,099 A 8/1996 Quint et al.
5,564,128 A 10/1996 Richardson
5,567,038 A 10/1996 Lary
D375,372 S 11/1996 Allen
5,575,554 A 11/1996 Guritz
5,601,358 A 2/1997 Chien
5,606,743 A 2/1997 Vogt et al.
5,608,808 A 3/1997 Da Silva
5,610,678 A 3/1997 Tsuboi et al.
5,644,189 A 7/1997 Busby
5,655,374 A 8/1997 Santilli
D383,754 S 9/1997 Yuen
D383,863 S 9/1997 Yuen
5,667,291 A 9/1997 Caplan
5,667,292 A 9/1997 Sabalvaro, Jr.
5,676,449 A 10/1997 Newsome
5,677,079 A 10/1997 Dezorzi
5,680,718 A 10/1997 Ratcliffe
5,688,039 A 11/1997 Johnson
D388,113 S 12/1997 Feinbloom
5,692,244 A 12/1997 Johnson
5,708,449 A 1/1998 Heacock
5,709,464 A 1/1998 Tseng
5,718,335 A 2/1998 Boudreaux
5,722,762 A 3/1998 Soll
5,730,290 A 3/1998 Futo
5,741,060 A 4/1998 Johnson
5,743,621 A 4/1998 Mantha
5,758,947 A 6/1998 Glatt
5,774,338 A 6/1998 Wessling, III
5,786,665 A 7/1998 Ohtsuki et al.
5,800,278 A 9/1998 Varriano
5,806,961 A 9/1998 Dalton et al.
5,822,636 A 10/1998 Cho
5,829,063 A 11/1998 Cheng
5,829,860 A 11/1998 Lawther et al.
5,836,673 A 11/1998 Lo
5,845,778 A 12/1998 Hickey, Jr.
5,845,987 A 12/1998 Painter
5,857,220 A 1/1999 Erny
5,865,333 A 2/1999 Wolfe
5,871,271 A 2/1999 Chien
D407,187 S 3/1999 Makki
5,876,241 A 3/1999 Frantz
5,893,631 A 4/1999 Padden
5,894,604 A 4/1999 Crabb
5,911,494 A 6/1999 Lary
5,918,966 A 7/1999 Arnold
5,920,910 A 7/1999 Calvo
5,921,674 A 7/1999 Koczi
5,922,489 A 7/1999 Adachi
5,931,693 A 8/1999 Yamazaki
5,946,071 A 8/1999 Feldman
5,982,969 A 11/1999 Sugiyama
5,997,165 A 12/1999 Lehrer
6,005,536 A 12/1999 Beadles et al.
6,007,212 A 12/1999 Chan
6,007,213 A 12/1999 Baumgartner
6,009,563 A 1/2000 Swanson
6,012,822 A 1/2000 Robinson
6,012,827 A 1/2000 Caplan et al.
D420,035 S 2/2000 Hartman
D420,207 S 2/2000 Barton
6,021,525 A 2/2000 Mertins
6,023,788 A 2/2000 McCallum
6,028,627 A 2/2000 Helmsderfer
6,032,291 A 3/2000 Asenguah
6,032,293 A 3/2000 Makki
6,056,413 A 5/2000 Urso
D428,431 S 7/2000 Jordan
6,086,214 A 7/2000 Ridge
6,087,037 A 7/2000 Rieder
6,088,053 A 7/2000 Hammack
6,094,749 A 8/2000 Proctor
6,113,243 A 9/2000 Saul
6,113,244 A 9/2000 Baumgartner
6,116,745 A 9/2000 Yei
6,124,056 A 9/2000 Kimura
6,126,294 A 10/2000 Koyama
6,167,570 B1 1/2001 Su
6,168,286 B1 1/2001 Duffy
6,172,657 B1 1/2001 Kamakura et al.
6,174,075 B1 1/2001 Fuwausa
6,176,601 B1 1/2001 Nester
6,206,543 B1 3/2001 Henry
6,236,007 B1 5/2001 Ho
6,237,147 B1 5/2001 Brockman
6,240,566 B1 6/2001 Scantlin
6,244,721 B1 6/2001 Rodriguez
6,250,769 B1 6/2001 Kirk
D445,928 S 7/2001 Sharrah
6,256,795 B1 7/2001 Habel
D446,324 S 8/2001 Lynch
6,290,368 B1 9/2001 Lehrer
6,299,323 B1 10/2001 Yu et al.
6,302,570 B1 10/2001 Petell et al.
6,306,538 B1 10/2001 Saitoh
6,307,526 B1 10/2001 Mann
6,311,350 B1 11/2001 Kaiserman
6,311,837 B1 11/2001 Blaustein et al.
6,320,822 B1 11/2001 Okeya et al.
6,325,521 B1 12/2001 Gregg
6,328,454 B1 12/2001 Davis
6,340,234 B1 1/2002 Brown, Jr.
6,345,716 B1 2/2002 Chapman
6,347,410 B1 2/2002 Lee
6,363,537 B1 4/2002 Park
6,366,344 B1 4/2002 Lach
6,367,949 B1 4/2002 Pederson
D457,670 S 5/2002 Allen
6,382,407 B1 5/2002 Chao
6,386,701 B1 5/2002 Khulusi
6,390,640 B1 5/2002 Wong et al.
6,398,386 B1 6/2002 Huang
6,416,199 B1 7/2002 Heine
6,431,904 B1 8/2002 Berelsman
6,439,738 B1 8/2002 Matthews et al.
6,442,764 B1 9/2002 Badillo
6,457,838 B1 10/2002 Dugmore et al.
6,461,015 B1 10/2002 Welch
6,461,025 B1 10/2002 Payne
6,474,830 B1 11/2002 Hansen
6,476,391 B1 11/2002 Zhang
6,497,493 B1 12/2002 Theisen
D469,198 S 1/2003 Olson
6,504,099 B2 1/2003 Huang

(56) References Cited

U.S. PATENT DOCUMENTS 6,523,973 B2 2/2003 Galli
6,530,672 B2 3/2003 Galli
6,538,567 B2 3/2003 Stewart
D473,890 S 4/2003 Waters
6,549,231 B1 4/2003 Matsui
6,553,570 B1 4/2003 Flynn
6,554,444 B2 4/2003 Shimada et al.
6,578,982 B1 6/2003 Lynch
D477,432 S 7/2003 Parsons
6,598,991 B2 7/2003 Altman
6,604,837 B2 8/2003 Sandberg
6,612,695 B2 9/2003 Waters
6,612,696 B2 9/2003 Waters
6,616,293 B2 9/2003 Mickey
6,634,031 B1 10/2003 Schlapkohl
6,642,667 B2 11/2003 Avis
D483,928 S 12/2003 Mansell
6,659,618 B2 12/2003 Waters
D484,905 S 1/2004 Waters
6,679,615 B2 1/2004 Spearing
6,704,044 B1 3/2004 Foster
6,709,142 B2 3/2004 Gyori
6,713,956 B2 3/2004 Hsing Chen et al.
6,715,309 B1 4/2004 Junkins
6,719,437 B2 4/2004 Lary
6,721,962 B1 4/2004 Polaire
D489,165 S 5/2004 Waters
6,733,150 B1 * 5/2004 Hanley ............... F21V 21/0885
2/209.13
6,749,166 B2 6/2004 Valentine et al.
6,760,925 B1 7/2004 Maxwell
6,764,194 B1 7/2004 Cooper
6,802,636 B1 10/2004 Bailey, Jr.
6,808,284 B1 10/2004 Chao
6,811,441 B2 11/2004 Simpson
6,817,711 B2 11/2004 Schubert
6,830,357 B2 12/2004 Lopez
D501,266 S 1/2005 Harris, Jr.
6,837,590 B2 1/2005 Marston
6,857,739 B1 2/2005 Watson
6,860,628 B2 3/2005 Robertson
6,863,416 B2 3/2005 Waters
6,865,285 B1 3/2005 Villa-Aleman
6,880,989 B2 4/2005 Sotome
6,908,208 B1 6/2005 Hyde
D507,368 S 7/2005 Waters
D507,369 S 7/2005 Waters
6,918,678 B2 7/2005 McClanahan
6,923,322 B2 8/2005 Lenker
6,929,375 B2 8/2005 Satomi
6,929,878 B2 8/2005 Chen et al.
6,932,216 B2 8/2005 Blaustein
6,935,761 B2 8/2005 Vanderschuit
6,941,583 B2 9/2005 Yan
6,966,668 B2 11/2005 Cugini
6,969,178 B2 11/2005 Zuloff
6,977,776 B2 12/2005 Volkenandt et al.
6,993,803 B2 2/2006 Chan
6,994,445 B1 2/2006 Pomes
6,997,552 B1 2/2006 Hung
7,000,841 B2 2/2006 Becker
7,003,353 B1 2/2006 Parkhouse
7,004,439 B1 2/2006 Taylor
7,004,582 B2 2/2006 Jannard et al.
7,008,074 B1 3/2006 Halm
7,021,790 B2 4/2006 Parsons
D520,460 S 5/2006 Wadsworth
7,052,154 B2 5/2006 Vanderschuit
7,055,179 B2 6/2006 Warner et al.
7,086,749 B1 8/2006 Hanley
7,094,981 B2 8/2006 Sorrentino et al.
7,104,670 B2 9/2006 Waters
7,105,939 B2 9/2006 Bednyak
7,111,956 B2 9/2006 Brown
7,114,823 B2 10/2006 McCullough et al.
7,118,241 B2 10/2006 Sohn
7,118,262 B2 10/2006 Negley
7,128,434 B1 10/2006 Nally
7,143,451 B2 12/2006 Lundgren
7,147,324 B2 12/2006 Jannard et al.
7,147,338 B2 12/2006 Gregg
7,150,526 B2 12/2006 Jannard et al.
7,163,309 B2 1/2007 Sohn
7,182,478 B2 * 2/2007 Marston ................. A42B 1/244
362/558
7,186,159 B1 3/2007 Baxter
7,192,151 B2 3/2007 Clupper
7,209,652 B2 4/2007 Uenaka
7,213,917 B2 5/2007 Jannard et al.
7,216,973 B2 5/2007 Jannard et al.
7,234,831 B1 6/2007 Hanley
7,226,180 B2 7/2007 Sung
7,255,437 B2 8/2007 Howell et al.
7,264,350 B2 9/2007 Jannard et al.
D553,177 S 10/2007 Chen
7,278,734 B2 10/2007 Jannard et al.
7,281,826 B2 10/2007 Huang
7,318,654 B2 1/2008 McClanahan
7,331,064 B1 2/2008 Quintal
D566,044 S 4/2008 D'Arco
D568,922 S 5/2008 Anderl
7,369,174 B2 5/2008 Olita
7,377,664 B2 5/2008 Waters
7,377,666 B1 5/2008 Tyler
7,427,149 B2 9/2008 Sohn
7,431,472 B2 10/2008 Becker
7,438,409 B2 10/2008 Jordan
7,457,536 B2 11/2008 Hamada et al.
7,461,764 B2 12/2008 Thompson
7,466,040 B2 12/2008 Bruwer
7,470,022 B2 12/2008 Lerner
7,506,992 B2 3/2009 Carter
D591,675 S 5/2009 Waters
7,562,979 B2 7/2009 Waters
7,576,800 B2 8/2009 Swain
D600,208 S 9/2009 Waters
D600,738 S 9/2009 Su
7,598,928 B1 10/2009 Buskop
7,607,775 B2 10/2009 Hermanson et al.
7,609,295 B2 10/2009 Aridome
7,611,255 B1 11/2009 Lagassey
7,621,000 B1 11/2009 Fulton
D605,381 S 12/2009 Mastrantonio
7,661,818 B2 2/2010 Waters
D611,086 S 3/2010 Meng-Suen
7,677,751 B2 3/2010 Kinsman
7,699,485 B1 * 4/2010 Lagassey ............... A41D 1/002
362/105
7,699,486 B1 4/2010 Beiner
7,708,422 B2 5/2010 Sohn
D617,826 S 6/2010 Waters
7,753,547 B2 7/2010 Waters
7,755,219 B2 7/2010 Bruwer
7,784,960 B2 8/2010 Lahtinen
7,862,979 B2 1/2011 Waters
7,934,846 B1 5/2011 Schwanz
7,938,553 B1 5/2011 Beiner
7,942,543 B2 5/2011 Ritter
8,002,437 B2 8/2011 Sohn
8,075,153 B2 12/2011 Werner
8,141,395 B2 3/2012 Dillavou
8,157,403 B2 4/2012 Lau
D659,351 S 5/2012 Benkendorfer
8,277,069 B2 10/2012 Zuloff
8,333,485 B2 12/2012 Waters
8,364,220 B2 1/2013 Sandmore
8,388,164 B2 3/2013 Waters
8,491,145 B2 7/2013 Waters
8,550,651 B2 10/2013 Waters
8,698,027 B2 4/2014 Anderst
8,757,831 B2 6/2014 Waters
8,757,931 B2 6/2014 Puttmann
8,769,723 B1 7/2014 Ilges et al.
8,774,420 B2 7/2014 Belafonte et al.

(56) References Cited

U.S. PATENT DOCUMENTS 8,813,268 B1 8/2014 Fitzgerald et al.
8,919,984 B1 12/2014 Fitzgerald
8,950,012 B2 2/2015 Ilges et al.
9,057,500 B2 6/2015 Opolka
D734,925 S 7/2015 Waters
9,101,174 B2 8/2015 Waters
9,526,287 B2 12/2016 Waters
9,609,902 B2 4/2017 Waters
9,872,530 B2 1/2018 Waters
10,117,476 B2 11/2018 Waters
10,159,294 B2 12/2018 Waters
11,206,888 B2 12/2021 Waters
2001/0024365 A1 9/2001 Aknine
2002/0027777 A1 3/2002 Takasu
2002/0129989 A1 9/2002 Parsons
2002/0131275 A1 9/2002 Yamamoto et al.
2002/0159250 A1 10/2002 Kuo
2002/0163800 A1 11/2002 Hansen
2002/0186557 A1 12/2002 Lary et al.
2002/0187806 A1 12/2002 Jang
2003/0079387 A1 5/2003 Derose
2003/0086053 A1 5/2003 Waters
2003/0086054 A1 5/2003 Waters
2003/0106918 A1 6/2003 Hung
2003/0122958 A1 7/2003 Olita
2003/0151910 A1 8/2003 Marston
2003/0169207 A1 9/2003 Beigel
2003/0189824 A1 10/2003 Meeder et al.
2003/0206269 A1 11/2003 Waters
2003/0231489 A1 12/2003 Hsiao
2004/0001150 A1 1/2004 Schindler, II et al.
2004/0008157 A1 1/2004 Brubaker
2004/0085745 A1 5/2004 Yoshihara
2004/0128737 A1 7/2004 Gesten
2004/0141312 A1 7/2004 Henning
2004/0141316 A1 7/2004 Twardawski
2004/0165109 A1 8/2004 Lee
2004/0222638 A1 11/2004 Bednyak
2004/0240067 A1 12/2004 Marusi et al.
2004/0240204 A1 12/2004 Russ et al.
2004/0252487 A1 12/2004 McCullough
2004/0264173 A1 12/2004 Vanderschuit
2004/0264176 A1 12/2004 Vanderschuit
2005/0001433 A1 1/2005 Seelin
2005/0035925 A1 2/2005 Ostromek et al.
2005/0047116 A1 3/2005 Gagne
2005/0066422 A1 3/2005 Yan
2005/0072458 A1 4/2005 Goldstein
2005/0078473 A1 4/2005 Zuloff
2005/0083676 A1 4/2005 Vanderschuit
2005/0099799 A1 5/2005 Cugini et al.
2005/0105285 A1 5/2005 Maden
2005/0161313 A1 7/2005 Sorrentino
2005/0174753 A1 8/2005 Cao
2005/0204490 A1 9/2005 Kemp et al.
2005/0211187 A1 9/2005 Harman et al.
2005/0211574 A1 9/2005 Reeve
2005/0213340 A1 9/2005 Suzuki
2005/0219837 A1 10/2005 Brown
2005/0226433 A1 10/2005 McClanahan
2005/0237479 A1 10/2005 Rose
2005/0248932 A1 11/2005 Waters
2005/0254238 A1 11/2005 Parker et al.
2005/0265015 A1 12/2005 Salazar
2006/0012974 A1 1/2006 Su
2006/0012975 A1 1/2006 Huttner et al.
2006/0037125 A1 2/2006 McDowell
2006/0091784 A1 5/2006 Conner et al.
2006/0092621 A1 5/2006 Lai
2006/0093264 A1 5/2006 Tabuchi
2006/0107952 A1 5/2006 Schlosser
2006/0125624 A1 6/2006 Ostrovsky
2006/0126323 A1 6/2006 Pomes
2006/0138440 A1 6/2006 Jyo
2006/0141828 A1 6/2006 Dean
2006/0157569 A1 7/2006 Becker
2006/0158895 A1 7/2006 Brands et al.
2006/0165160 A1 7/2006 Winningstad
2006/0198122 A1 9/2006 Senter
2006/0212994 A1 9/2006 Proctor
2006/0215393 A1 9/2006 Vanderschuit
2006/0232955 A1 10/2006 Labine
2006/0238995 A1 10/2006 Wang
2006/0239018 A1 10/2006 Jardin
2006/0263677 A1 11/2006 Tsai
2006/0285315 A1 12/2006 Tufenkjian
2006/0286443 A1 12/2006 Huang
2006/0291193 A1 12/2006 Hill
2007/0003826 A1 1/2007 Hsu
2007/0013865 A1 1/2007 Joradn
2007/0030442 A1 2/2007 Howell et al.
2007/0048598 A1 3/2007 Huang
2007/0053179 A1 3/2007 Pang
2007/0058361 A1 3/2007 Sevilla
2007/0064413 A1 3/2007 Slater
2007/0072655 A1 3/2007 Cascone
2007/0074752 A1 4/2007 Shau
2007/0086182 A1 4/2007 Kelly
2007/0097668 A1 5/2007 Choi
2007/0127250 A1 6/2007 Waters
2007/0140675 A1 6/2007 Yanagi
2007/0145746 A1 6/2007 Biamonte
2007/0153500 A1 7/2007 Waters
2007/0153537 A1 7/2007 Scott et al.
2007/0154029 A1 7/2007 Werner
2007/0159810 A1 7/2007 Kim
2007/0159823 A1 7/2007 Ho
2007/0171628 A1 7/2007 Seade
2007/0189003 A1 8/2007 Daley
2007/0206373 A1 9/2007 Whiteside et al.
2007/0236649 A1 10/2007 Lin
2007/0236915 A1 10/2007 Chen
2007/0236916 A1 10/2007 Hsu
2008/0049963 A1 2/2008 Mann et al.
2008/0068559 A1 3/2008 Howell
2008/0069391 A1 3/2008 Steyn et al.
2008/0130272 A1 6/2008 Waters
2008/0152482 A1 6/2008 Patel
2008/0186705 A1 8/2008 Liu
2008/0198579 A1 8/2008 Crye et al.
2008/0263750 A1 10/2008 Chen
2008/0266839 A1 10/2008 Claypool
2009/0010474 A1 1/2009 Ouryouji
2009/0126076 A1 5/2009 Ochoa
2009/0147503 A1 6/2009 Bennett
2009/0148149 A1 6/2009 Chishima
2009/0193566 A1 8/2009 Waters
2009/0213323 A1 8/2009 Mermanson
2009/0268936 A1 10/2009 Goldberg et al.
2009/0323317 A1 12/2009 Spartano
2010/0024091 A1 2/2010 Mehtab et al.
2010/0095431 A1 4/2010 Liao
2010/0134761 A1 6/2010 Johns et al.
2010/0182563 A1 7/2010 Waters
2010/0207540 A1 8/2010 Walton
2010/0214767 A1 8/2010 Waters
2010/0242155 A1 9/2010 Carullo
2010/0289433 A1 11/2010 Lau
2010/0307931 A1 12/2010 Waters
2010/0313335 A1 12/2010 Waters
2011/0013135 A1 1/2011 Waters
2011/0061145 A1* 3/2011 Zuloff .................... A42B 1/244
2/209.13
2011/0075095 A1 3/2011 Waters
2011/0122601 A1 5/2011 Waters
2011/0187989 A1 8/2011 Waters
2011/0210685 A1 9/2011 Liao
2011/0211156 A1 9/2011 Beiner
2011/0228211 A1 9/2011 Waters
2011/0242799 A1 10/2011 Dyer
2012/0014095 A2 1/2012 Waters
2012/0098465 A1 4/2012 Rothschild
2013/0025612 A1 1/2013 Hunter
2013/0033852 A1 2/2013 Liao

(56) References Cited

U.S. PATENT DOCUMENTS

| | | | | |
|---|---|---|---|---|
| 2013/0111651 | A1 | 5/2013 | Waters | |
| 2013/0192961 | A1 | 8/2013 | Waters | |
| 2013/0198935 | A1 | 8/2013 | Waters | |
| 2013/0242544 | A1 * | 9/2013 | Liao | F21L 4/08 362/106 |
| 2014/0049947 | A1 | 2/2014 | Lombard et al. | |
| 2014/0101827 | A1 | 4/2014 | Dennis | |
| 2014/0173807 | A1 | 6/2014 | Waters | |
| 2014/0237706 | A1 | 8/2014 | O'Conner | |
| 2014/0268683 | A1 | 9/2014 | Waters | |
| 2014/0268684 | A1 | 9/2014 | Waters | |
| 2014/0270685 | A1 | 9/2014 | Letke | |
| 2015/0036324 | A1 | 2/2015 | Fitzgerald | |
| 2015/0063777 | A1 | 3/2015 | Letke | |
| 2015/0358515 | A1 | 12/2015 | Resnick | |
| 2016/0337745 | A1 | 11/2016 | Adams | |
| 2019/0178477 | A1 | 6/2019 | Ross | |
| 2020/0037685 | A1 | 2/2020 | Graham | |
| 2022/0061444 | A1 * | 3/2022 | Gibson | F21V 21/084 |

FOREIGN PATENT DOCUMENTS

| | | | |
|---|---|---|---|
| AU | 199940150 | | 2/2000 |
| AU | 199959545 | | 3/2000 |
| AU | 2002100976 | | 6/2003 |
| AU | 2003100277 | | 7/2003 |
| AU | 2003248016 | | 11/2004 |
| CA | 2029772 | | 5/1991 |
| CA | 2198625 | | 2/1997 |
| CA | 2184336 | | 5/1997 |
| CA | 2406450 | | 11/2001 |
| CA | 2466175 | A1 | 5/2003 |
| CA | 2608746 | A1 | 11/2006 |
| CA | 2610073 | A1 | 5/2008 |
| CN | 86208973 | | 10/1987 |
| CN | 2173427 | | 8/1994 |
| CN | 2239167 | | 11/1996 |
| CN | 2423761 | | 3/2001 |
| CN | 2433836 | | 6/2001 |
| CN | 2458892 | | 11/2001 |
| CN | 2508592 | | 9/2002 |
| CN | 2544551 | | 4/2003 |
| CN | 1462597 | | 12/2003 |
| CN | 1603677 | A | 4/2005 |
| CN | 101950091 | A | 1/2011 |
| CN | 301445845 | S | 1/2011 |
| CN | 201796205 | U | 4/2011 |
| DE | 3043007 | | 6/1982 |
| DE | 8230583 | | 9/1983 |
| DE | 9410886 | | 9/1994 |
| DE | 29808222 | | 11/1998 |
| DE | 19837151 | | 4/2000 |
| DE | 20007738 | | 9/2000 |
| DE | 29915607 | | 9/2000 |
| DE | 20017922 | | 2/2001 |
| DE | 20020515 | | 8/2001 |
| DE | 20101380 | | 8/2001 |
| DE | 20106261 | | 9/2001 |
| DE | 20111815 | | 11/2001 |
| DE | 10046295 | | 3/2002 |
| DE | 20117740 | | 4/2002 |
| DE | 20201557 | | 5/2002 |
| DE | 20200058 | | 6/2002 |
| DE | 10103591 | | 8/2002 |
| DE | 20110124 | | 8/2002 |
| DE | 10057388 | | 9/2002 |
| DE | 20209115 | | 10/2002 |
| DE | 20210806 | | 10/2002 |
| DE | 10216152 | | 12/2002 |
| DE | 20209611 | | 1/2003 |
| DE | 20313629 | | 12/2003 |
| DE | 10330589 | | 1/2004 |
| DE | 20319297 | | 2/2004 |
| DE | 20318860 | | 4/2004 |
| DE | 20318949 | | 4/2004 |
| DE | 202004004960 | | 9/2005 |
| DE | 102007006860 | A1 | 8/2007 |
| EP | 1072204 | | 1/2001 |
| EP | 1374707 | | 1/2004 |
| EP | 1451633 | | 9/2004 |
| EP | 2290433 | A1 | 3/2011 |
| EP | 2299311 | A1 | 3/2011 |
| EP | 2350734 | A1 | 8/2011 |
| FR | 1221782 | | 6/1960 |
| FR | 2798721 | | 3/2001 |
| FR | 2824709 | | 11/2002 |
| FR | 2829365 | | 3/2003 |
| FR | 2833068 | | 6/2003 |
| FR | 2833069 | | 6/2003 |
| GB | 2268043 | | 1/1994 |
| GB | 2272073 | A | 5/1994 |
| GB | 2316293 | | 2/1998 |
| GB | 2358575 | | 8/2001 |
| GB | 2363314 | | 12/2001 |
| GB | 2374401 | | 10/2002 |
| GB | 2378117 | | 2/2003 |
| GB | 2378118 | | 2/2003 |
| GB | 2388298 | | 11/2003 |
| JP | S61006304 | | 1/1986 |
| JP | 4289602 | | 10/1992 |
| JP | H08027610 | A | 1/1996 |
| JP | H08298004 | A | 11/1996 |
| JP | H09209210 | A | 8/1997 |
| JP | H09296319 | A | 11/1997 |
| JP | H1039407 | | 2/1998 |
| JP | H10081275 | A | 3/1998 |
| JP | H10331019 | A | 12/1998 |
| JP | 2001131818 | A | 5/2001 |
| JP | 3084061 | | 2/2002 |
| JP | 3090973 | | 1/2003 |
| JP | 2004207580 | | 7/2004 |
| JP | 2004346470 | | 12/2004 |
| JP | 2005216832 | A | 8/2005 |
| JP | 2006097156 | A | 4/2006 |
| JP | 2007119980 | | 5/2007 |
| JP | 2008542558 | | 11/2008 |
| KR | 200164075 | | 2/2000 |
| KR | 200168822 | Y1 | 2/2000 |
| KR | 200168826 | | 2/2000 |
| KR | 200260980 | | 1/2002 |
| KR | 20020065405 | | 8/2002 |
| KR | 200331201 | | 10/2003 |
| TW | 241462 | | 2/1995 |
| TW | 275188 | | 5/1996 |
| TW | 286489 | | 9/1996 |
| TW | 324234 | | 1/1998 |
| TW | 329607 | | 4/1998 |
| TW | 386364 | | 4/2000 |
| WO | 9402043 | | 2/1994 |
| WO | 9704434 | | 2/1997 |
| WO | 0113033 | | 2/2001 |
| WO | 2001013033 | | 2/2001 |
| WO | 0177575 | | 10/2001 |
| WO | 2001077575 | | 10/2001 |
| WO | 0244611 | | 6/2002 |
| WO | 02062165 | | 8/2002 |
| WO | 02074398 | | 9/2002 |
| WO | 02077520 | | 10/2002 |
| WO | 2003040808 | A2 | 5/2003 |
| WO | 03047377 | | 6/2003 |
| WO | 03083811 | | 10/2003 |
| WO | 2004000054 | | 12/2003 |
| WO | 2004064555 | | 5/2004 |
| WO | 2004103104 | | 12/2004 |
| WO | 2005002378 | | 1/2005 |
| WO | 2005005882 | | 1/2005 |
| WO | 2005038337 | | 4/2005 |
| WO | 2005096856 | | 10/2005 |
| WO | 2005098314 | | 10/2005 |
| WO | 2006037845 | | 4/2006 |
| WO | 2006124928 | | 11/2006 |
| WO | 2007073047 | | 6/2007 |
| WO | 2007073219 | | 6/2007 |

(56) References Cited

FOREIGN PATENT DOCUMENTS

| | | | |
|---|---|---|---|
| WO | 2007089236 | | 8/2007 |
| WO | 2007093348 | | 8/2007 |
| WO | 2007112338 | | 10/2007 |
| WO | 2008011750 | | 1/2008 |
| WO | 2009079656 | A2 | 6/2009 |
| WO | 2010099504 | | 9/2010 |
| WO | 2011041591 | A1 | 4/2011 |
| WO | 2011100471 | A1 | 8/2011 |
| WO | 2011137400 | | 11/2011 |
| WO | 2011137406 | | 11/2011 |
| WO | 2013096895 | | 6/2013 |
| WO | 2013096904 | | 6/2013 |
| ZA | 20043826 | A | 9/2005 |

OTHER PUBLICATIONS

"Complaint", *Waters Industries, Inc.* v. *Totes Isotoner Corporation, et al.*, United States District Court for the Northern District of Illinois, Case No. 1:10-cv-04487 (Docket No. 1, Jul. 19, 2010) (26 pages).

'Initial Non-Infringement, Invalidity and Unenforceability, Contentions' with Exhibit A, Exhibits B-1 and B-2, and Exhibits C-1 through C7, *Waters Industries, Inc.* v. *Outdoor Cap Co., Inc.*, United States District Court for the Northern District of Illinois, Case No. 1:13-cv-07191, 263 pages (Dec. 18, 2013).

'Waters Industries' Answer to Defendant's Amended Counterclaims', *Waters Industries, Inc.* v. *Outdoor Cap Co., Inc.*, United States District Court for the Northern District of Illinois, Case No. 1:13-cv-07191, 12 pages (Document No. 38, Dec. 18, 2013).

Docket report of *Waters Industries, Inc.* v. *Outdoor Cap Co., Inc.*, United States District Court for the Northern District of Oklahoma, Case No. 4:13-cv-00665-CVE-FHM, filed Oct. 8, 2013 (7 pages).

"Answer and Counterclaim of Defendant Outdoor Cap Co., Inc.," *Waters Industries, Inc.* v. *Outdoor Cap Co., Inc.*, United States District Court for the Northern District of Illinois, Case No. 1:13-cv-07191, 11 pages (Document No. 13, Oct. 30, 2013).

"Declaratory Judgment Complaint" with Exhibit A and Exhibit B, *Waters Industries, Inc.* v. *Outdoor Cap Co., Inc.*, United States District Court for the Northern District of Illinois, Case No. 4:13-cv-00665-CVE-FHM, 52 pages (Document No. 2, Oct. 8, 2013).

"First Amended Answer and Counterclaim of Defendant Outdoor Cap Co., Inc." with Exhibit A through G, *Waters Industries, Inc.* v. *Outdoor Cap Co., Inc.*, United States District Court for the Northern District of Illinois, Case No. 1:13-cv-07191, 201 pages (Document No. 34, Dec. 11, 2013).

"Plaintiff's Complaint" with Exhibit A, *Waters Industries, Inc.* v. *Outdoor Cap Co., Inc.*, United States District Court for the Northern District of Illinois, Case No. 1:13-cv-07191, 7 pages (Document No. 1, Oct. 8, 2013).

"Plaintiff's First Amended Complaint" with Exhibit A and Exhibit B, *Waters Industries, Inc.* v. *Outdoor Cap Co., Inc.*, United States District Court for the Northern District of Illinois, Case No. 4:13-cv-00665-CVE-FHM, 51 pages (Document No. 11, Oct. 10, 2013).

"Plaintiff's Initial Infringement Contentions Under Local Patent Rule 2.2" with Appendix A, Figures 1-5, and Exhibits 1-3, *Waters Industries, Inc.* v. *Outdoor Cap Co., Inc.*, United States District Court for the Northern District of Illinois, Case No. 1:13-cv-07191, 58 pages (Nov. 27, 2013).

"Waters Industries' Answer to Defendant's Counterclaims," *Waters Industries, Inc.* v. *Outdoor Cap Co., Inc.*, United States District Court for the Northern District of Illinois, Case No. 1:13-cv-07191, 5 pages (Document No. 28, Nov. 20, 2013).

'Panther Vision Power Beanie—Available at Bunnings Warehouse,' screenshot of a video posted to Youtube on Jun. 16, 2014. Retrieved from the Internet on Mar. 9, 2015. URL: https://www.youtube.com/watch?v=ZOWodRoEuvc. (1 page).

"4 LED Lighted Fleece Beanie; POWERCAP," article posted on-line to WISE-SHOP.ca. Added to the businesses catalog on Nov. 6, 13. Retrieved from the Internet on Jun. 17, 2014. URL: http://www.wise-shop.ca/product_info.php?products_id=489.

"Panther Vision Powercap LED Lighted Beanie," article posted on-line and available for sale at Dick's Sporting Goods with reviews posted as early as Nov. 14, 2014. Retrieved from the Internet on Mar. 9, 2015. URL: http://www.dickssportinggoods.com/product/index.jsp?productid=52376526. (4 pages).

"Powercap Beanie," article posted on-line to Panther Vision. Publication date unknown. Retrieved from the Internet on Mar. 9, 2015. URL: http://www.panther-vision-promotional-products.com/Prod-18-1-96-10/powercap-trade-beanie.htm. (2 pages).

"Answer to Complaint, Counterclaims", filed by Sweet Baby, Inc. dba AJ Morgan, *Waters Industries, Inc.* v. *Sweet Baby, Inc. dba AJ Morgan et al.*, United States District Court for the Northern District of Illinois, Case No. 1:09-cv-07595, 15 pages (Docket No. 27, Feb. 4, 2010).

"Complaint", *Waters Industries, Inc.* v. *Kikkerland Design, Inc.*, United States District Court for the Northern District of Illinois, Case No. 1:10-cv-04076, 21 pages (Docket No. 1, Jun. 30, 2010).

"Complaint", *Waters Industries, Inc.* v. *Mr. Christmas Incorporated, et al.*, United States District Court for the Northern District of Illinois, Case No. 1:09-cv-07577, 38 pages (Docket No. 1, Dec. 7, 2009).

"Complaint", *Waters Industries, Inc.* v. *Sweet Baby, Inc. dba AJ Morgan et al.*, United States District Court for the Northern District of Illinois, Case No. 1:09-cv-07595, 78 pages (Docket No. 1, Dec. 7, 2009).

"Complaint", *Waters Industries, Inc.* v. *The Gerson Company*, United States District Court for the Northern District of Illinois, Case No. 1:10-cv-01865,71 pages (Docket No. 1, Mar. 24, 2010).

"Complaint" with Exhibit A through D, *Waters Industries, Inc.* v. *JJI International, Inc., et al.*, United States District Court for the Northern District of Illinois, Case No. 1:11-cv-03791, 73 pages (Document No. 1, Jun. 3, 2011).

"Defendants' Answer and Counterclaim" and "Responses to Specific Allegations", *Waters Industries, Inc.* v. *JJI International, Inc. and Stein Mart, Inc.*, United States District Court for the Northern District of Illinois, Case No. 1:11-cv-03791, 16 pages (Document No. 15, Jun. 28, 2011).

"Defendants' Initial Non-Infringement and Invalidity Contentions" with Appendix A though G, *Waters Industries, Inc.* v. *JJI International, Inc. and Stein Mart, Inc.*, United States District Court for the Northern District of Illinois, Case No. 1:11-cv-03791, 78 pages (Aug. 9, 2011).

"Kikkerland Design, Inc.'s Answer to Complaint, Affirmative Defenses and Counterclaim", *Waters Industries, Inc.* v. *Kikkerland Design, Inc.*, United States District Court for the Northern District of Illinois, Case No. 1:10-cv-04076, 12 pages (Docket No. 17, Aug. 6, 2010).

"Plaintiff's Initial Infringement Contentions Under Local Patent Rule 2.2" with Appendix A through F,*Waters Industries, Inc.* v. *JJI International, Inc. and Stein Mart, Inc.*, United States District Court for the Northern District of Illinois, Case No. 1:11-cv-03791, 44 pages (Jul. 26, 2011).

"Plaintiffs Initial Response to Invalidity Contentions Under Local Patent Rule 2.5" with Appendix A and B, *Waters Industries, Inc.* v. *JJI International, Inc. and Stein Mart, Inc.*, United States District Court for the Northern District of Illinois, Case No. 1:11-cv-03791, 29 pages (Aug. 23, 2011).

Docket report of *Waters Industries, Inc.* v. *Kikkerland Design, Inc.*, United States District Court for the Northern District of Illinois, Case No. 1:10-cv-04076, filed Jun. 30, 2010, 4 pages.

Docket report of *Waters Industries, Inc.* v. *Mr. Christmas Incorporated, et al.*, United States District Court for the Northern District of Illinois, Case No. 1:09-cv-07577, filed Dec. 7, 2009, 5 pages.

Docket report of *Waters Industries, Inc.* v. *Sweet Baby, Inc. dba AJ Morgan et al.*, United States District Court for the Northern District of Illinois, Case No. 1:09-cv-07595, filed Dec. 7, 2009, 7 pages.

Docket report of *Waters Industries, Inc.* v. *The Gerson Company*, United States District Court for the Northern District of Illinois, Case No. 1:10-cv-01865, filed Mar. 24, 2010, 3 pages.

Extended European search report issued in the related European Application No. 08 86 2753.4 dated Dec. 7, 2012 (7 pages).

(56) References Cited

OTHER PUBLICATIONS

Extended European search report issued in the related European Application No. 10 18 1592.6 dated Jan. 31, 2011 (7 pages).
Extended European search report issued in the related European Application No. 10 18 1593.4 dated Feb. 1, 2011 (8 pages).
International Search Report from the International Bureau of WIPO issued in the related International Application No. PCT/US02/35665, dated Jun. 27, 2003, 1 page.
Notification Concerning Transmittal of International Preliminary Report on Patentability and the Written Opinion of the International Searching Authority from the International Bureau of WIPO for International Application No. PCT/US2013/076689, dated Jul. 2, 2015, 7 pages.
Notification of Transmittal of the International Search Report and the Written Opinion of the International Searching Authority, or the Declaration from the International Bureau of WIPO for International Application No. PCT/US2010/050978, dated Dec. 3, 2010, 16 pages.
Notification of Transmittal of the International Search Report and the Written Opinion of the International Searching Authority, or the Declaration from the International Bureau of WIPO for International Application No. PCT/US2014/028613, dated Sep. 19, 2014, 13 pages.
Notification of Transmittal of the International Search Report and the Written Opinion of the International Searching Authority, or the Declaration from the International Bureau of WIPO for International Application No. PCT/US2008/087542 dated May 4, 2009, 12 pages.
Notification of Transmittal of the International Search Report and the Written Opinion of the International Searching Authority, or the Declaration from the International Bureau of WIPO for International Application No. PCT/US2010/025689 dated May 4, 2010, 14 pages.
Notification of Transmittal of the International Search Report and the Written Opinion of the International Searching Authority, or the Declaration from the International Bureau of WIPO for International Application No. PCT/US2011/024400, dated Apr. 29, 2011, 13 pages.
Notification of Transmittal of the International Search Report and the Written Opinion of the International Searching Authority, or the Declaration from the International Bureau of WIPO for International Application No. PCT/US2011/034686 dated Aug. 1, 2011, 16 pages.
Notification of Transmittal of the International Search Report and the Written Opinion of the International Searching Authority, or the Declaration from the International Bureau of WIPO for International Application No. PCT/US2011/051596, dated Jan. 18, 2012, 9 pages.
Notification of Transmittal of the International Search Report and the Written Opinion of the International Searching Authority, or the Declaration from the International Bureau of WIPO for related International Application No. PCT/US2011/034695 dated Oct. 28, 2011, 12 pages.
Office Action issued in related Canadian Application No. 2,466,175 dated Sep. 22, 2010 (3 pages).
Office Action issued in related European Application No. 02 778 755.5 dated Feb. 20, 2007 (7 pages).
Office Action issued in related Japanese Application No. 2010-539834 dated Mar. 19, 2013, with English translation (10 pages).
Patent Examination Report issued in related Australian Application No. 2008338320 dated Nov. 1, 2012 (5 pages).
Supplementary European search report issued in the related European Application No. 02 77 8755 dated Jan. 19, 2005 (2 pages).
Written Opinion of the International Searching Authority and International Search Report from the International Bureau of WIPO for International Application No. PCT/US2006/018968, dated Oct. 16, 2006, 12 pages.
Written Opinion of the International Searching Authority and International Search Report from the International Bureau of WIPO for International Application No. PCT/US2008/087542, dated May 4, 2009, 12 pages.
Notification of Transmittal of the International Search Report and the Written Opinion of the International Searching Authority, or the Declaration from the International Bureau of WIPO for International Application No. PCT/US2014/028945 dated Jul. 31, 2014, 9 pages.
"Answer to Complaint, Counter claims", filed by Lilian Vernon Corporation, *Waters Industries, Inc.* v. *Sweet Baby, Inc. dba AJ Morgan et al.*, United States District Court for the Northern District of Illinois, Case No. 1:09-cv-07595, 15 pages (Docket No. 28, Feb. 4, 2010).

* cited by examiner

LIGHTED HEADGEAR AND ACCESSORIES THEREFOR

FIELD OF THE INVENTION

This disclosure relates to lighting devices and, in particular, to lighted headgear and accessories therefor.

BACKGROUND

Often an individual desires a light source focused to illuminate an area while performing a task, or a light source directed in a general outward direction for visibility. Holding a typical flashlight is an option, but such lighting devices are often cumbersome and may detract from the task being completed because the flashlight must be held with one hand leaving only the other hand free for performing the task. As a result, hands-free lighting is often desired because the individual desiring illumination does not need to hold the light source. Hands-free lighting that include light sources mounted to headgear or eyeglasses are known.

Lighted headgear may include illumination sources mounted to hats. The light source can be oriented to direct light outwardly in such a manner so that the wearer can be seen by others or oriented downward and forward to illuminate an area in the wearer's field of view. Often, the light source is one or more LEDs. Such LED lighted headgear, which may include LEDs mounted to a typical baseball-style hap or beanie-style cap, are convenient for hands-free lighting in a number of recreational activities, such as camping, hunting, fishing, jogging, or the like.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures is combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In general, the lighted headgear and light module accessories described herein include self-contained light modules. As used herein, self-contained light modules include one or more illumination sources and one or more internal power sources to energize the illumination sources. The one or more illumination sources include, for example, one or more light-emitting diodes (LEDs). The power sources may be batteries such as rechargeable batteries (e.g., lithium-ion batteries). The lighted headgear and light module accessories include battery charging interfaces for recharging rechargeable batteries. As used herein, a battery charging interface may be a fixed electrical interface such as a USB port that is electrically coupled to a rechargeable battery. In this way, a user may connect a power cable to the battery charging interface to recharge the rechargeable battery. The battery charging interfaces are covered when the self-contained light modules are assembled so as to protect internal components of the self-contained light modules from moisture and debris. The self-contained light modules may be removed from an article of clothing and disassembled to permit access to the battery charging interfaces for recharging the light modules.

The light module accessories described herein may be mounted to headgear or other articles of clothing. The headgear may include, for example, a baseball-style hat, a beanie-style cap, or other suitable headgear such as visors, helmets, caps, hats, headbands, sweatband, hoods, clothing, or the like. While the following description and illustrations may describe a specific power assembly and illumination source with a specific headgear or accessory, the various components described herein may be included in any of the embodiments.

Figure 1:
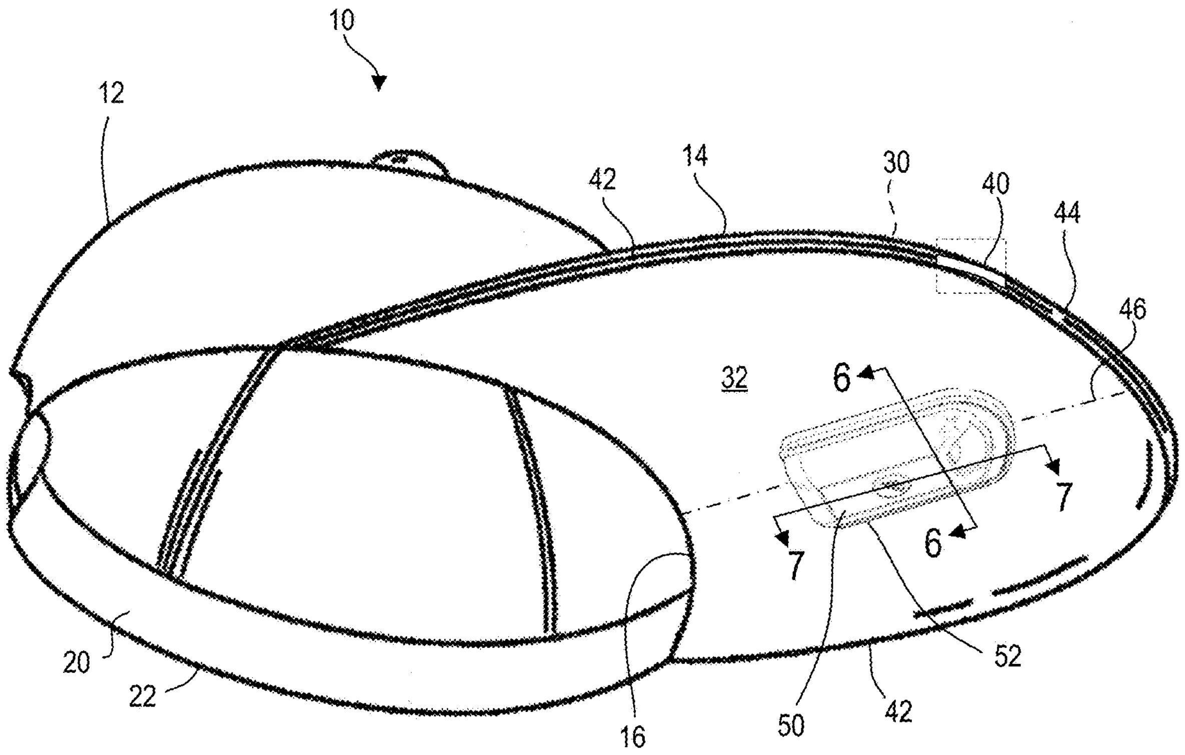
FIG. 1 is a perspective view of a baseball-style lighted hat having a self-contained light module removably secured to a mount secured to the hat to provide hands-free illumination generally forwardly and downwardly from the hat.

Referring to FIG. 1, lighted headgear such as a lighted hat 10 is shown. The lighted hat 10 is in the form of a baseball-style cap having a head-fitting portion, such as crown portion 12, for fitting on a head of a user. The lighted hat 10 also includes a brim portion 14 that extends in a generally forward direction from the head-fitting portion. For example, the brim portion 14 projects forwardly from a lower, forward edge 16 of the crown portion 12. In some forms, the lighted hat 10 further includes a hat band 20 disposed around a lower edge portion 22 of the inside of the lighted hat 10. The hat band 20 may be composed of an elastic and/or wicking material to conform the crown portion 12 more closely to a wearer's head and/or wick moisture away from the wearer's head.

The brim portion 14 has an upper major surface 30 and a lower major surface 32. As used herein, the upper major surface 30 faces generally upwardly when the lighted hat 10 is worn by a user, and the lower major surface 32 faces generally downwardly when the lighted hat 10 is worn by a user. The upper major surface 30 may be an upper surface of an upper covering, and the lower major surface 32 may be lower surface of a lower covering. For example, the upper major surface 30 and the lower major surface 32 may be surfaces of fabric coverings or other suitable material.

The brim portion 14 can further include a brim insert 40 that extends between the upper major surface 30 and the lower major surface 32. The brim portion 14 includes perimeter edge portions, such as side edge portions 42 and a front edge portion 44 that extends between the side edge portions 42. The brim portion 14, and more particularly, the lower major surface 32, has a generally fore-and-aft central axis 46 that extends in a forward direction between the side edges 42 and toward the front edge 44. The upper and lower major surfaces 30, 32 and the brim insert 40 may be joined together, such as by stitching, adhesive, or the like.

The lighted hat 10 includes a light module 50 and a mount 52 for securing the light module 50 to the lighted hat 10. The mount 52 is fixedly secured at the lower major surface 32 of the brim portion 14, which may be a generally arcuate downwardly-facing surface of the brim portion 14. The mount 52 has a plate body 52A that includes an upper plate wall 53. Prior to the mount 52 being secured to the brim portion 14, the upper plate wall 53 may be generally planar between opposite side edges 61 of the mount 52. The mount 52 may be formed of a resilient elastomeric material such that when the mount 52 is secured to the brim portion 14, the upper plate wall 53 generally conforms to the arcuate downwardly-facing surface 32 of the brim portion 14. For example, with the mount 52 secured to the brim portion 14, the side edges 61 of the mount 52 are lower than a central portion 63 of the mount 52 to provide a flush fit between the mount 52 and the arcuate brim portion 14. The mount 52 may be secured to the lower major surface 32, for example, via adhesive, heat sealing, fasteners, etc. As discussed, the lower major surface 32 may be a lower surface fabric covering. As described below, the mount 52 retains the light module 50 as the light module slides along a longitudinal axis between a first longitudinal position within the mount and a second longitudinal position offset from the first axial position.

Figure 2:
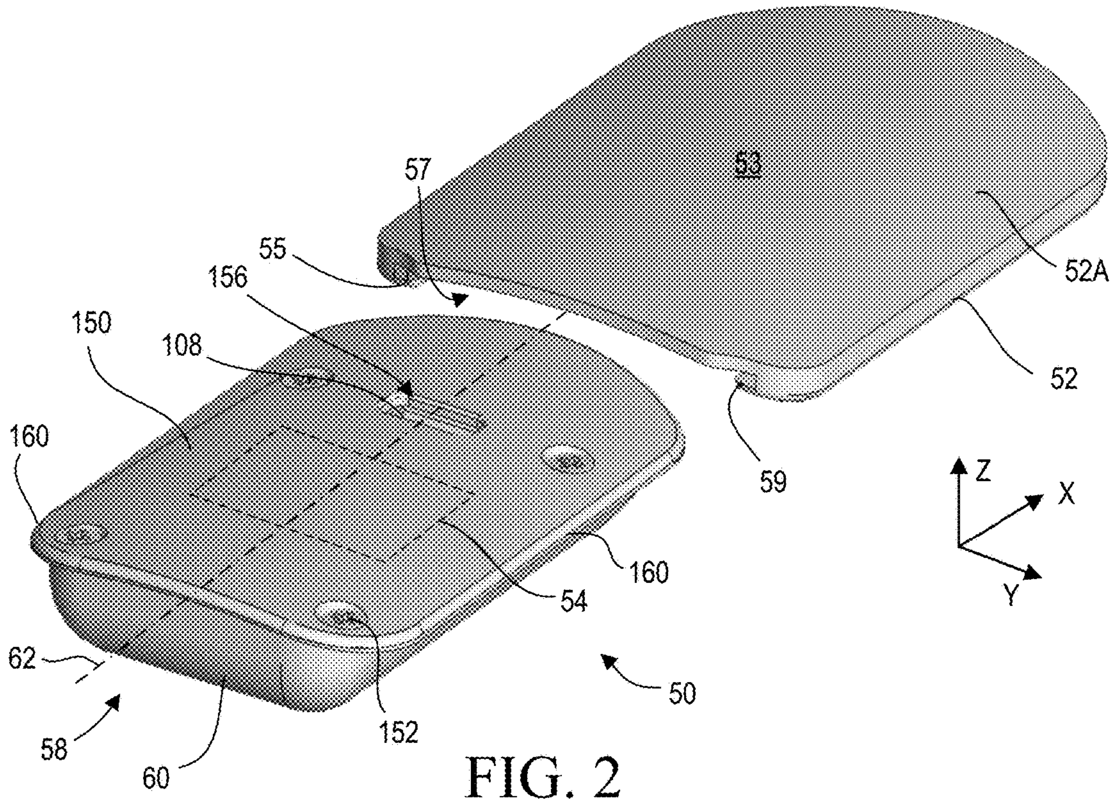
FIG. 2 is a perspective view showing the light module disengaged from the mount for exposing a battery charging interface of the light module.

As shown in FIG. 2, the light module 50 is removable from the mount 52. As such, the light module 50 may be detached from the lighted hat 10; for example, to recharge or replace a power source 54 of the light module 50. As illustrated, the light module 50 may be slidably mounted to the mount 52. More particularly, and as discussed in greater detail below, the mount 52 includes one or more tracks 55 that are configured to receive protrusions or flange portions 160 of the light module 50 to guide linear translation of the light module 50 along a central fore-and-aft axis 62 relative to the mount 52 and brim portion 14, and to retain and support the light module 50 upon installation.

With the light module 50 slid out of engagement with the mount 52, a user may access a battery charging interface 108 of the light module 50 through an access port or opening 156 in a housing cover 150 to recharge the power source 54 of the light module 50. When the light module 50 is installed with the mount 52, the access opening 156 is covered by the mount 52 such that the battery charging interface 108 is inaccessible and is protected by the mount 52. In one approach, the light module 50 forms a fluid-tight or substantially fluid-tight seal with the mount 52 when installed with the mount 52 (e.g., sufficient to comply with Ingress Protection (IP) rating of IP 67). For example, the inter-engagement between the flange portions 160 of the light module 50 and the tracks 55 of the mount 52 may form a watertight seal.

Referring to FIGS. 3-7, the light module 50 includes a housing or housing assembly 58 that houses various components of the light module 50. The housing assembly 58 includes a lower housing 60 and a housing cover 150. The lower housing 60 includes housing wall portions that extend about the housing interior 64. For example, the lower housing 60 may include a forward inclined wall portion 70 (FIG. 5), a rearward wall portion 72 (FIG. 4), opposing side wall portions 74 (FIG. 6), and a lower wall portion 76 (FIG. 7) that extends between the forward inclined wall portion 70 and rearward wall portion 72 and the sidewall portions 74.

Figure 5:
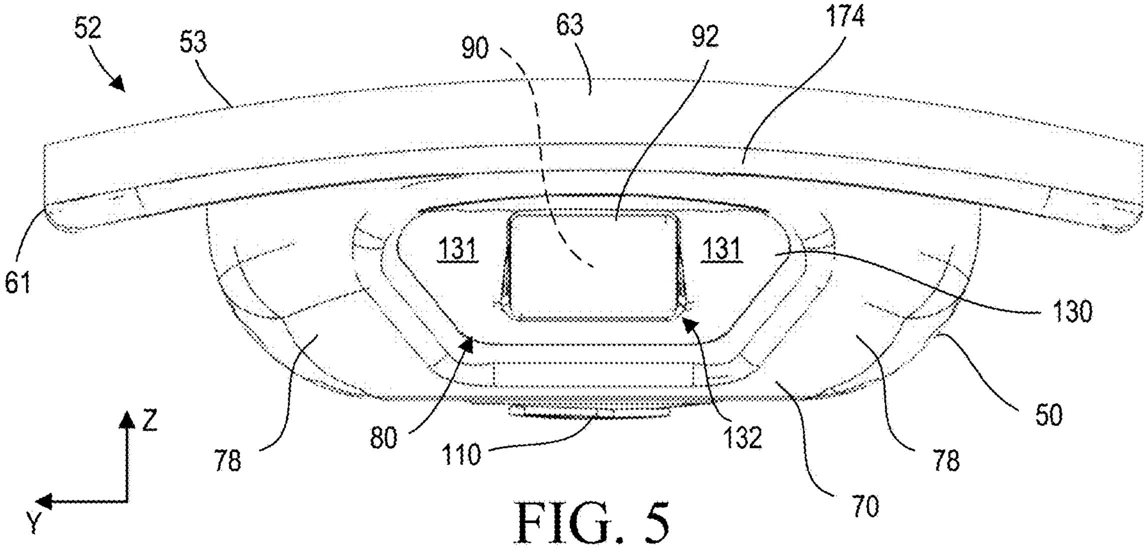
FIG. 5 is a front elevation view of the light module secured to the mount showing a light emitting portion of the light module.

As shown in FIG. 5, the forward wall portion 70 includes one or more opposite sections, referred to herein as forward wall side portions 78, that at least partially define an opening 80. For example, two opposite forward wall portions 78 cooperate to at least partially form a forward opening 80, also referred to herein as a light opening, therebetween.

Figure 7:
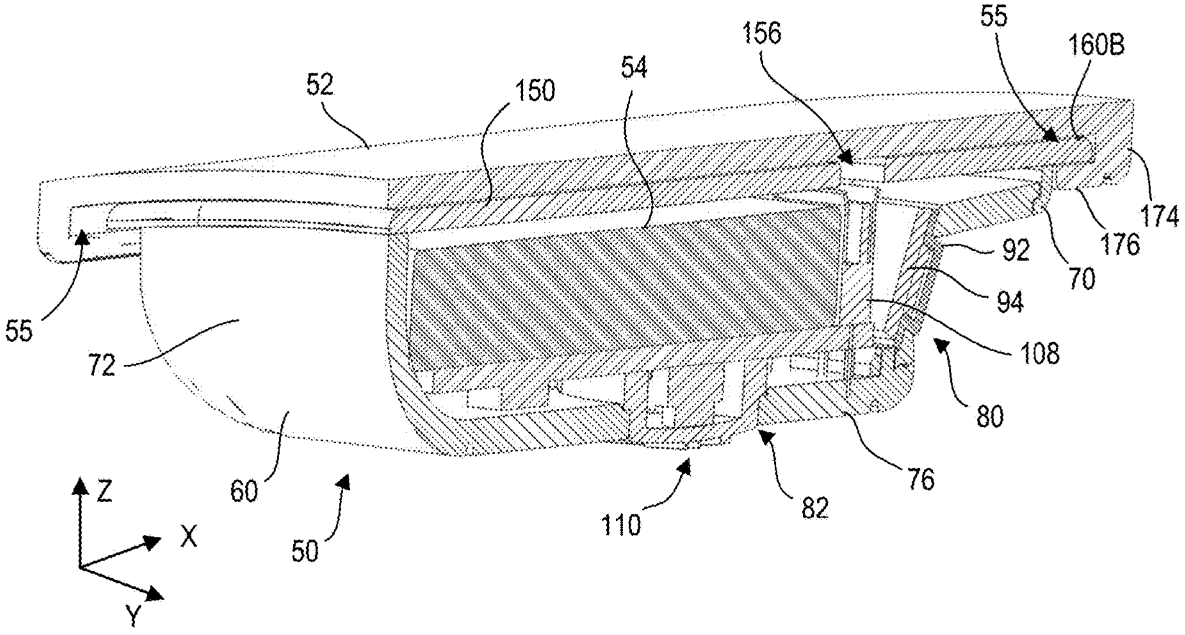
FIG. 7 is a cross-sectional view taken along the line 7-7 of FIG. 1 showing a front flange portion of the light module retained within a front portion of the track of the mount.

As shown in FIG. 7, the lower wall 76 has a generally planar wall portion that includes an actuator opening 82. As discussed in greater detail elsewhere herein, the actuator opening 82 is sized to receive a user-operable actuator 110, such as a push-button.

As discussed in greater detail below, the lower housing 60 houses a power source 54, a light source 90, and other components discussed herein within an interior 64 of the lower housing 60.

The housing cover 150 extends over the components contained in the lower housing 60. The housing cover 150 has a generally arcuate upper surface 151 that curves from one side edge to the opposite side edge. The curvature of the arcuate upper surface 151 may have a curvature that generally corresponds to a curvature of a brim portion 14 of a hat 10. The housing cover 150 may be formed of a material such as plastic that is more rigid than the resilient elastomeric material of the mount 52. In one form, the curvature of the mount 52 secured to the brim portion 14 is slightly less than that of the housing cover 150. In this way, when the light module 50 is removably secured to the mount 52, the housing cover 150 causes the mount 52 to generally conform to the curvature of the housing cover 150 (see e.g., FIG. 4) As discussed in greater detail below, the housing cover 150 cooperates with the resilient elastomeric mount 52 to form a fluid-tight or substantially fluid-tight seal between the light module 50 and the mount 52 (e.g., sufficient to comply with Ingress Protection (IP) rating of IP 67).

The housing cover 150 is secured to the lower housing 60 to form the housing assembly 58. For example, one or more fasteners 152 may be used to secure the housing cover 150 to the lower housing 60 at fastener holes 152A, 152B in the housing cover 150 and lower housing 60, respectively. In another approach, the housing cover 150 may be integrally formed with at least a portion of the lower housing 60.

Figure 6:
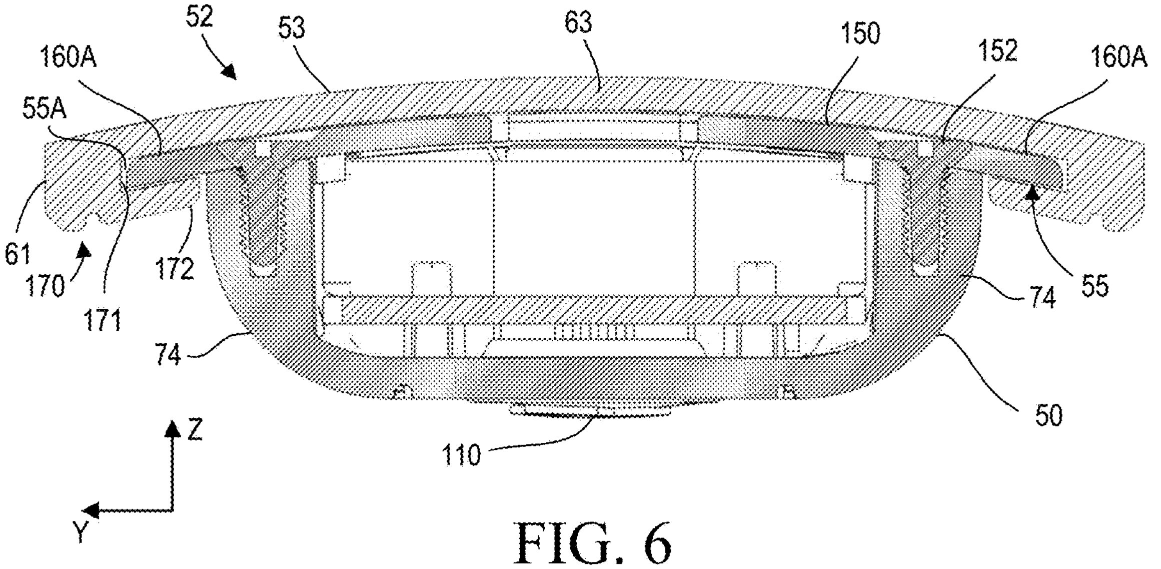
FIG. 6 is a cross-sectional elevation view taken along the line 6-6 of FIG. 1 showing the outer side flange portions of the light module retained within the side track portions of the mount.

The housing cover 150 may have a lateral dimension (e.g., in the Y direction) that is greater than a lateral dimension of the lower housing 60. In this way, the housing cover 150 forms one or more overhangs or flange portions 160 that extend laterally outwardly from the lower housing 60. As shown in FIG. 6, the housing cover 150 may form side flange portions 160A that extend from both lateral sides of the light module 50 beyond the side wall portions 74 of the lower housing 60. As shown in FIG. 7, the housing cover 150 may also form a forward flange portion 160B that extends forwardly beyond the forward inclined wall portion 70 of the lower housing 60.

As discussed, the light module 50 includes one or more power sources 54 for energizing a light source 90. In the illustrated and preferred form, the power source 54 is a rechargeable (e.g., lithium-ion) battery. In other approaches, the power source 54 may be non-rechargeable, replaceable batteries such as cylindrical batteries, coin cell batteries, or the like.

The light module 50 further includes a light source 90 mounted at least partially within the housing interior 64. The light source 90 provides illumination outwardly from the housing assembly 58; for example, through the forward opening 80. When the light module 50 is installed with the mount 52, the forward opening 80 of the lower housing 60 is below the mount 52 (e.g., below central portion 63 of the mount 52) such that the light source 90 is oriented forwardly and downwardly of the mount 52. As illustrated, the light source 90 includes a single LED. A cover or lens 92 may extend across the LED light source 90.

The light module 50 further includes a heat sink member 94. The heat sink member 94 is formed of, or includes, conductive material. More particularly, the heat sink member 94 is formed of a material with high thermal conductivity, such as an aluminum alloy. As such, the heat sink member 94 may have a thermal conductivity value of between about 120 W/mK to about 240 W/mK to conduct heat away from the light source 90 during operation of the light module 50. The heat conduction by the heat sink member 94 reduces the risk of damaging components of the light module 50 through overheating. As shown, the heat sink member 94 has a generally rectangular body. Although depicted as having a single heat sink member 94, the light module 50 may be provided with two or more heat sink members.

The light module 50 also includes a switch device 100. The switch device 100 is electrically coupled to the light source 90 and the power source 54 for selectively energizing the light source 90. The switch device 100 includes, for example, a circuit board 102 and a battery charging interface 108 in the housing interior 64, and an actuator 110, which may include a push-button actuator that extends from the housing interior 64 to the exterior of the housing 50 to be accessed by a user. The circuit board 102, which may be a printed circuit board (PCB) that includes electrical circuitry 106, is electrically coupled to the light source 90.

The battery charging interface 108 receives charging power for charging the power source 54. The battery charging interface 108 may include, for example, a universal serial bus (USB) interface that receives power from an external source through a USB charging cable. The USB interface may be a USB-A, USB-B, USB-C, USB, micro USB, or mini USB interface. Other suitable battery charging interfaces 108 such as Firewire, Lightning connector, or Ethernet interfaces may be used. The battery charging interface 108 is aligned with the access opening 156 of the housing cover 150 such that a power supply can be inserted through the access opening 156 into the housing interior 64 to engage the battery charging interface 108.

In the assembled configuration, the heat sink member 94 is coupled to the circuit board 102, and the light source 90 is secured to a heat sink member 94. More particularly, the heat sink member 94 is disposed between the light source 90 and the circuit board 102 such that the light source 90 is separated from the circuit board 102 by the heat sink member 94. As shown, the heat sink member 94 may be installed to be fixed in an inclined orientation relative to the circuit board 102. The inclination of the heat sink member 94 including the light source 90 fixed thereto generally corresponds to that of the forward inclined wall portion 70. In this way, the heat sink member 94 is oriented to extend generally parallel to the forward wall portion 70.

The light module 50 further includes a reflector 130. The reflector 130 may be a discrete reflector that is mounted to the lower housing 60 generally in the housing interior 64. More particularly, the reflector 130 is mounted at the forward opening 80 of the lower housing 60. The reflector 130 includes a rearward opening 132 (FIG. 5) that is aligned with the light source 90 to permit light emitted from the light source 90 to pass through the rearward opening 132. The reflector 130 is mounted to the lower housing 60 so that a plurality of reflective walls 131 of the reflector 130 extend generally forwardly and tapers outwardly away from the rearward opening 132 to the relatively large forward opening 80. As such, the light source 90 may emit light in a direction that is generally forward and generally downward from the light module 50. The reflector 130 may generally correspond to one or more of the reflectors described in U.S. Pat. No. 10,791,783, which is hereby incorporated in its entirety.

Figure 3:
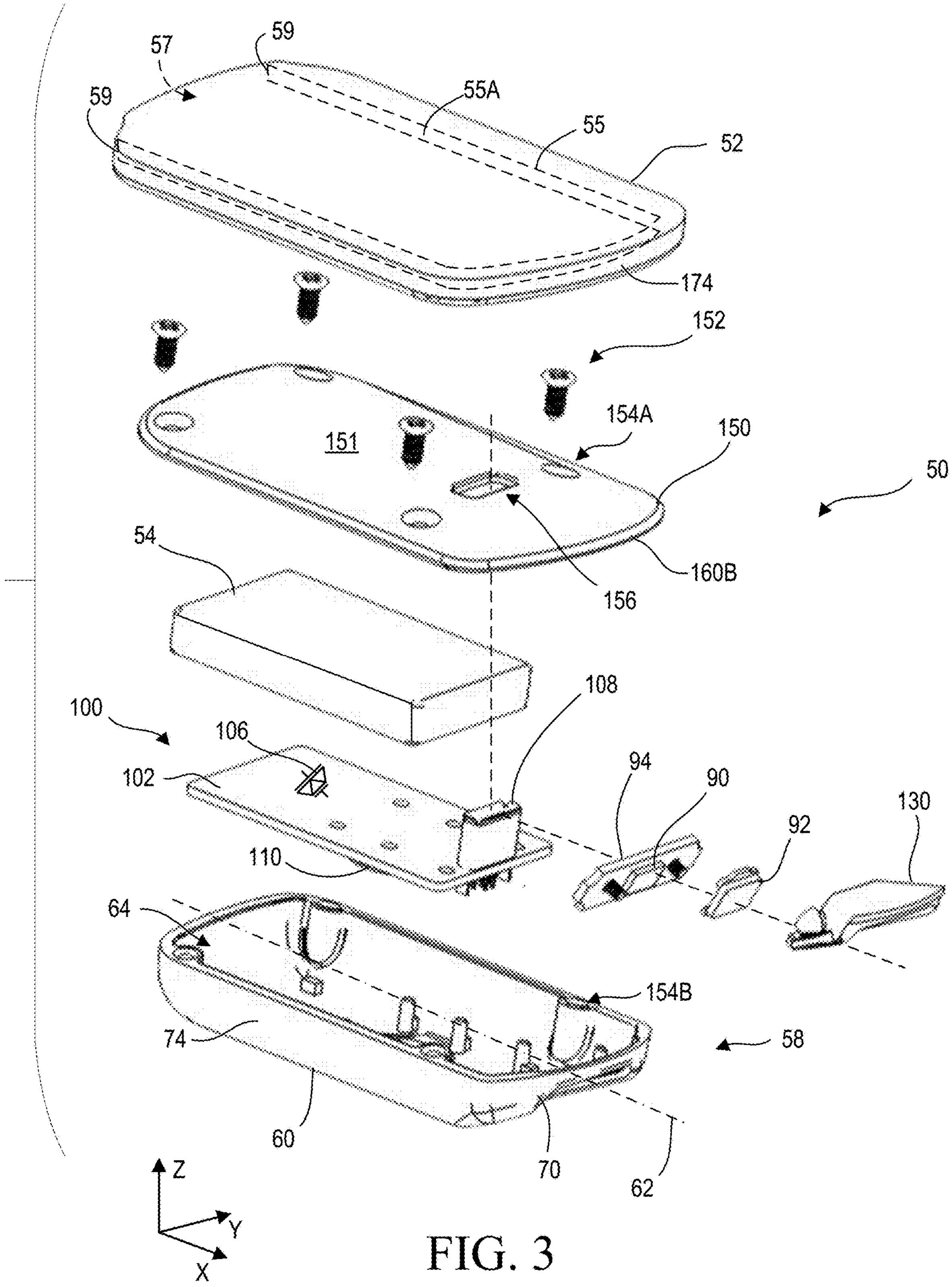
FIG. 3 is an exploded view of the light module and mount of FIG. 1 showing the mount and components of the light module.
Figure 4:
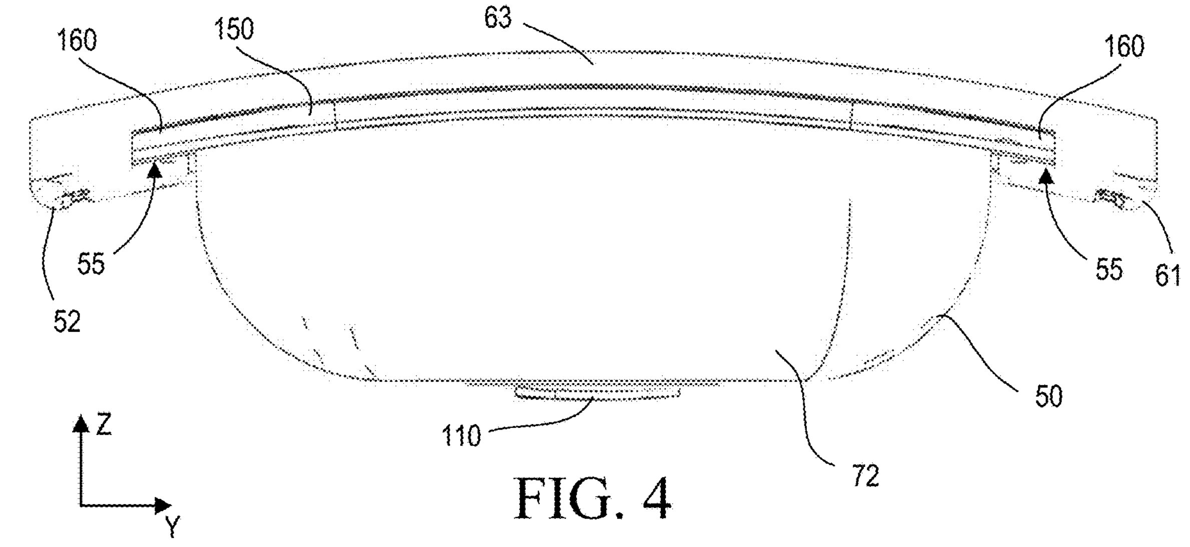
FIG. 4 is a rear elevation view of the light module secured to the mount with the mount having side track portions that slidably receive and retain outer side flange portions of the light module.

As discussed, the mount 52 includes one or more tracks 55 having a channel 55A formed therein for receiving and guiding the flanges 160 of the housing cover 150 to guide translation of the light module 50. The channel 55A can have a slot configuration. More particularly, and with reference to FIGS. 5 and 6, the mount 52 includes a channel wall portion 170 having a vertical depending wall portion 171 that extends downwardly (e.g., in the Z direction) from peripheral sides and forward end of upper plate wall 53 of the mount 52. The channel wall portion 170 also has a lower support wall portion 172 that extends laterally (e.g., in the Y direction) inwardly from the bottom of the vertical depending wall portion 171. Therefore, the channel wall portion 170 including its vertical depending wall portion 171 and support wall portions 172 have a generally U-shaped configuration. In this manner, the upper plate wall 53, vertical depending wall portion 171, and support wall portions 172 of the mount 52 cooperate to form the channel 55A therebetween. As shown in FIG. 3, the mount 52 may form a generally U-shaped continuous channel 55A of the generally U-shaped track 55 having an open wall receiving region 57 between side and end flange receiving regions 59 of the track.

When the light module 50 is removably secured to the mount 52, the flanges 160 are received in the track channels 55A, and the wall portions 53, 171, 172 cooperate to inhibit movement of the light module 50. For example, the depending wall portions 171 restrict lateral movement of the light module 50, and the support wall portions 172 support the weight of the light module 50 and keep the light module 50 from falling from the lighted hat 10 when worn.

Referring to FIG. 7, the mount 52 may also limit movement of the light module 50 in the forward (e.g., X) direction. For example, the mount 52 may include a forward edge wall portion 174 that extends downwardly from the upper plate wall 53 of the mount 52, and a forward support wall portion 176 that extends longitudinally (e.g., in the X direction) from the forward edge wall portion 172. The forward edge wall portion 174 forms a stop that inhibits further translation of the light module in the forward direction.

During installation of the light module 50, the light module 50 is slid along edge portions of the track 55 of the mount 52 until a forward portion of the light module 50 (e.g., forward flange 160B) abuts an internal surface of the forward edge wall portion 174. As discussed, the mount 52 is formed of a resilient elastomeric material and has a generally planar upper plate wall 53. Sliding of the light module 50 along the track 55 causes the flanges 160 of the light module 50 to bend the upper plate wall 53 and conform the mount 52 to the curvature of the housing cover 150. Upon installation, this tight engagement between the housing cover 150 of the light module 50 and the track 55 of the mount 52 secures the light module 50 to the lighted hat 10.

As discussed, the light module 50 and the mount 52 cooperate to protect the battery charging interface 108 and other internal components of the light module 50 from moisture or debris when the light module 50 is installed with the mount 52. For example, the upper plate wall 53 of the mount 52 extends over and blocks access to the access opening 156 of the light module 50 when the light module 50 is installed with the mount 52. Furthermore, as discussed above, the housing cover 150 of the light module 50 cooperates with the resilient elastomeric mount 52 to be in tight engagement therewith so as to form a fluid-tight or substantially fluid-tight seal around a perimeter of the light module 50 when the flanges 160 of the light module 50 are received in the track channels 55A of the mount 52. As also discussed, the light module 50 may subsequently be removed from the mount 52 (e.g., slid in an opposite linear direction) to recharge the power source 54.

Figure 8:
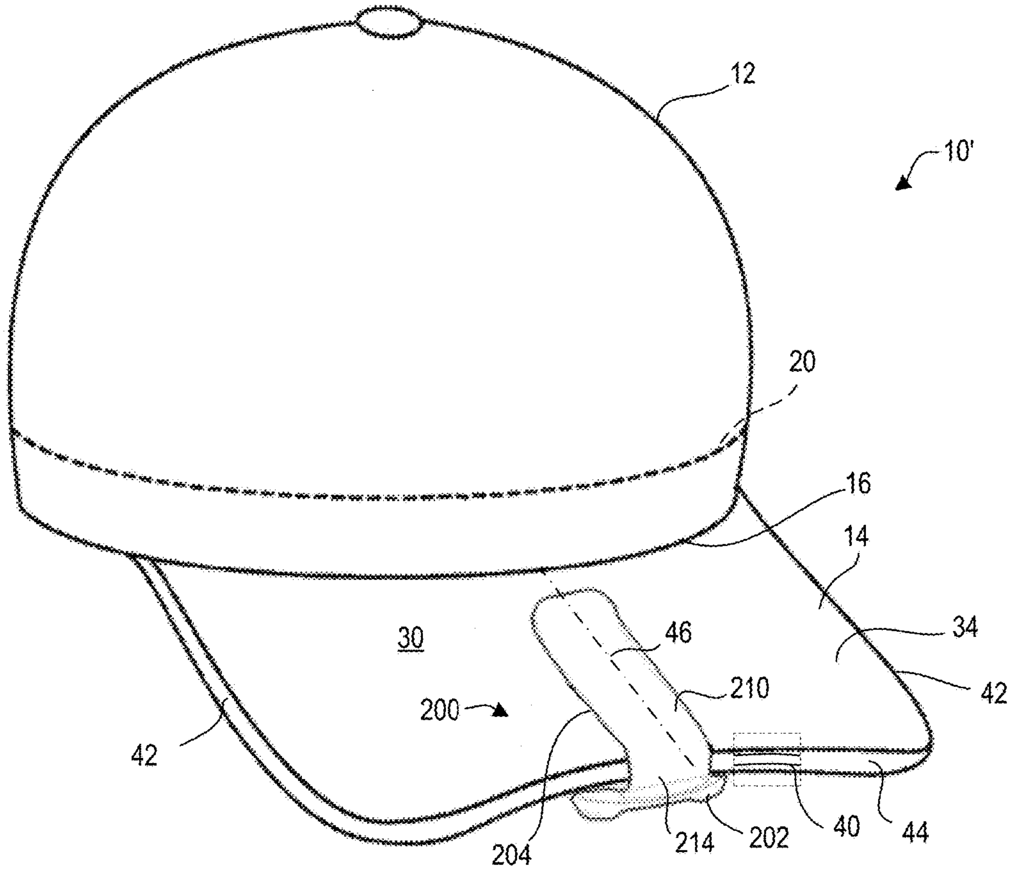
FIG. 8 is an upper perspective view of a baseball-style lighted hat having a self-contained light module removably secured to a removable mount removably secured to the hat to provide illumination generally forwardly and downwardly therefrom.
Figure 9:
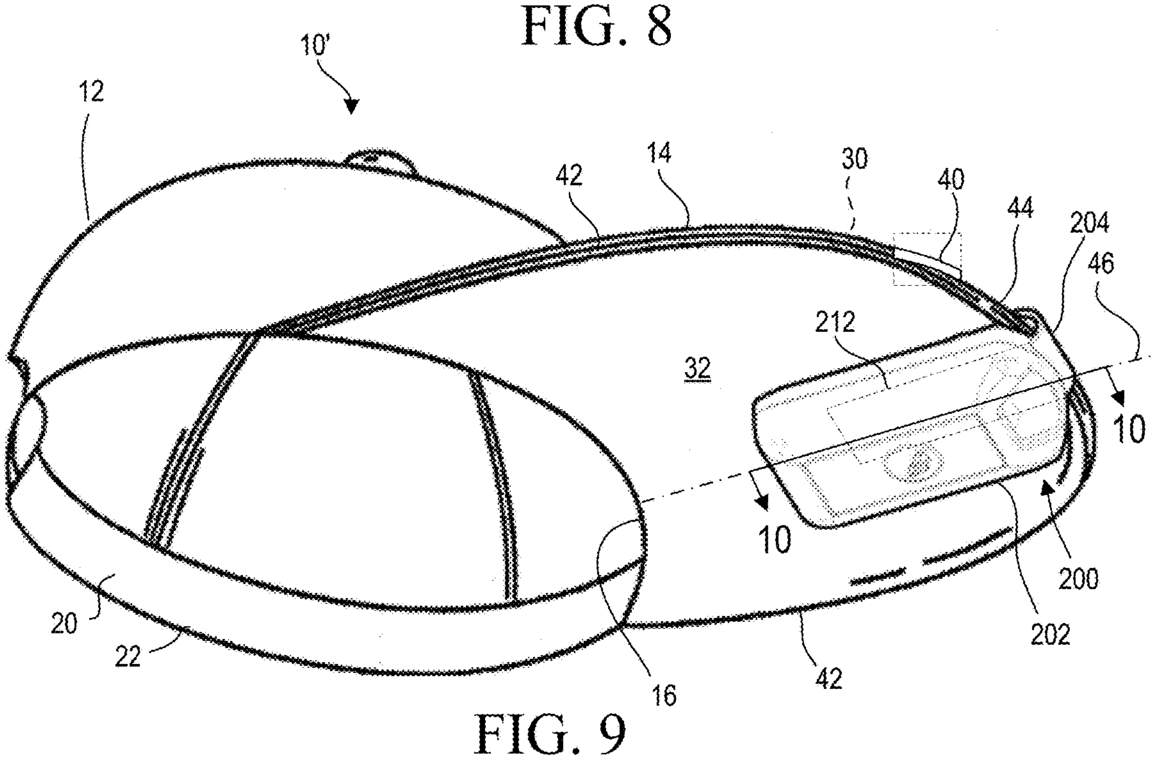
FIG. 9 is a lower perspective view of the baseball-style lighted hat of FIG. 8 showing the self-contained light module secured at the underside of a brim of the baseball-style lighted hat.

Referring to FIGS. 8 and 9, a light module 200 for headgear such as a hat 10' is shown. Hat 10' is a baseball-style lighted hat having many of the same features as the lighted hat 10 of FIG. 1. As such, common parts are referred to with like reference numerals.

Figure 12:
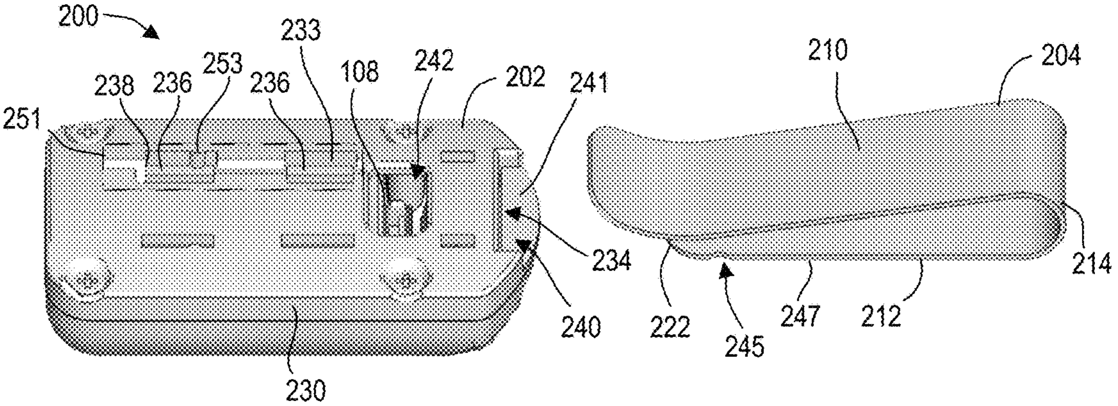
FIG. 12 is a perspective view of the clip-on light module with the removable mount removed from the light module to expose the battery charging interface of the light module.

The light module 200 includes a light module body 202 and a mount or attachment member such as a clip 204. The clip 204 includes a lower arm 212 that is releasably secured to the light module body 202, as discussed in greater detail below. The clip 204 also includes a resilient upper spring arm 210 that can be flexed about a hinge portion 214 of the clip 204, which may be an arcuate hinge portion that interconnects the arms 210 and 212. As shown in FIG. 12, the upper spring arm 210 may extend longitudinally a greater distance than the lower arm 212.

Figure 11:
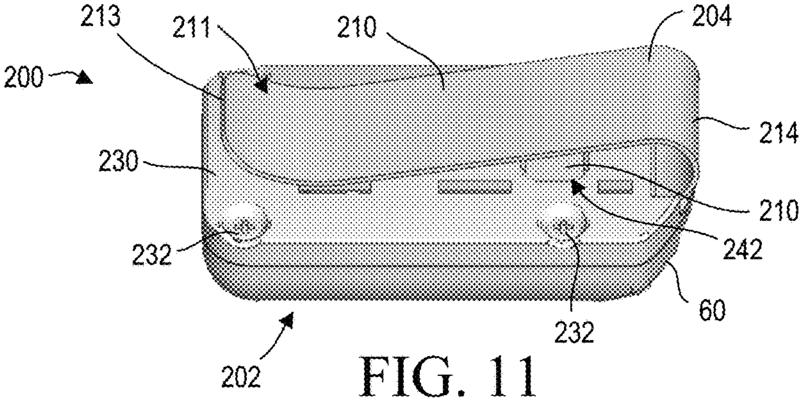
FIG. 11 is a perspective view of the self-contained light module with the removable mount removably secured to the light module so that an upper arm of the removable mount covers a battery charging interface of the light module.

As shown in FIG. 11, the upper spring arm 210 includes a generally upwardly directed clamp end portion 211. The clamp end portion 211 extends away from the light module body 202 such that during installation of the light module 200 on a brim portion 14 of a hat 10', an edge 213 of the clamp end portion 211 is spaced from the brim portion 14. In this way, the claim end portion 211 provides a grasping portion that facilitates pulling of the upper spring arm 210 away from the lower arm 212 during installation and removal of the light module 200 on hat 10'. The clamp end portion 211 also provides a generally smooth lower surface, thereby facilitation smooth sliding of the clamp end portion 211 along the brim portion 14. The clamp end portion 211 also spaces the edge 213 of the clamp end portion 211 away from the brim portion 14, thereby reducing damage to the brim portion 14 that may be caused by the edge 213 during installation and/or removal of the light module 200.

With the lower arm 212 releasably secured to the light module body 202, the upper spring arm 210 can be resiliently shifted away from the lower arm 212 about the arcuate hinge portion 214 to an open configuration such that the upper spring arm 210 is spaced from the module body 202 to allow the brim portion 14 of the hat 10' to fit therebetween to permit a user to slide the clip 204 across the upper major surface 30 of the brim portion 14 of the hat 10' (e.g., at the front edge 44). Upon release of the upper spring arm 210, the hinge portion 214 biases the upper spring arm 210 back toward the light module body 202. In this way, when the light module 200 is installed on a hat 10', the upper and lower arms 210, 212 of the clip 204 cooperate to clamp or pinch the brim portion 14 therebetween to releasably secure the light module 200 on the brim portion 14. A user may adjust the position of the light module 200 on the brim portion 14 by sliding the light module 200 backward (toward the users head) until the front edge 44 of the brim portion 14 abuts the hinge portion 214. In the installed configuration with the light module 200 releasably secured to the hat 10', the lower arm 212 maintains the light module body 202 tightly engaged against the lower major surface 32 to provide illumination generally forwardly and downwardly from the hat 10'.

Figure 10:
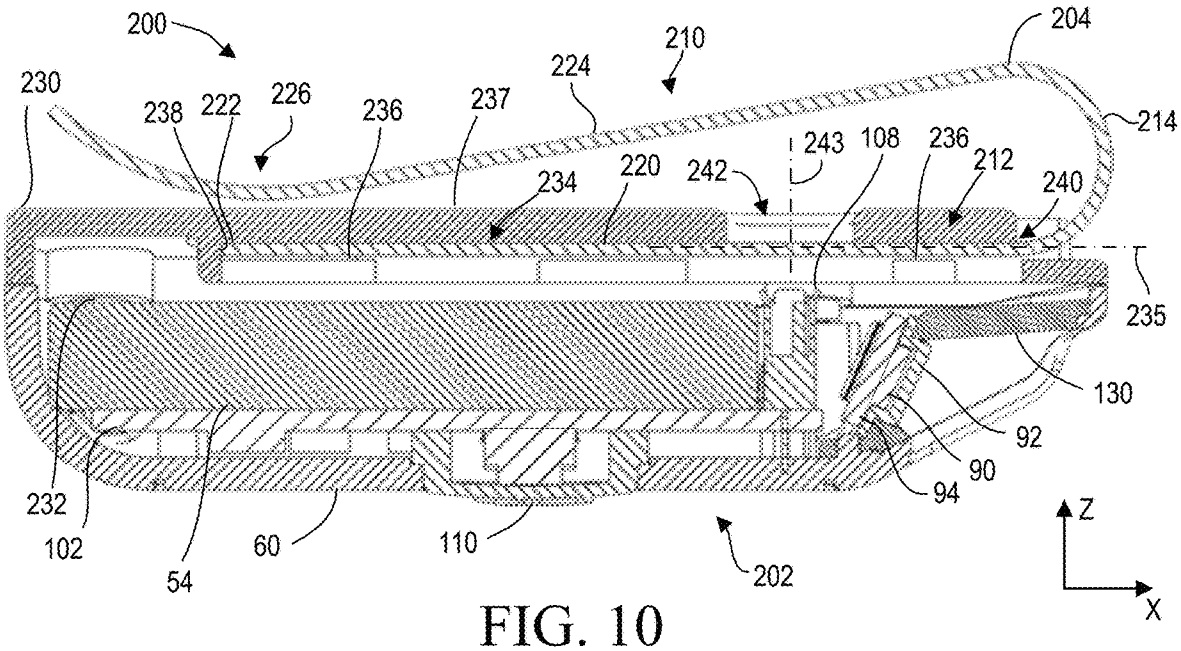
FIG. 10 is a cross-sectional elevation view taken along the line 10-10 of FIG. 9 showing a lower arm of the removable mount removably received in the light module.

Referring to FIGS. 10-12, the light module 200 is shown with the clip 204 releasably secured to the light module body 202. The lower arm 212 of the clip 204 may include a generally planar arm portion 220 between the arcuate hinge portion 214 and a free end 222 of the lower arm 212. The upper spring arm 210 may include a generally planar arm portion 224 between the hinge portion 214 and an arcuate end portion 226 of the upper spring arm 210. In one form, the upper spring arm 210 is more flexible than the lower arm 212 so that the lower arm 212 is generally rigid relative to the upper spring arm 210. The hinge portion 214 acts to bias the arcuate end portion 226 toward the lower arm 212 such that when the light module 200 is installed on a hat 10', the arcuate end portion 226 tightly engages against the brim portion 14 so it is clamped between the arcuate end portion 226 and the light module body 202, and specifically a housing cover 230 thereof described more fully hereinafter. In this manner, the light module 200 is releasably secured to the brim portion 14.

The light module body 202 has many of the same features as the light module 50 of FIGS. 1-7. As such, common parts are referred to with like reference numerals. For example, the light module body 202 includes a lower housing 60 that houses a power source 54, a light source 90, a battery charging interface 108, and other components such as those discussed with respect to the lower housing 60 of light module 50 of FIGS. 1-7.

The light module body 202 further includes a housing cover 230 as mentioned that is secured to the lower housing 60, for example, with one or more fasteners 232. The housing cover 230 includes a clip opening 240 for receiving the generally rigid lower arm 212 of the clip 204 therethrough. The clip opening 240 includes a lead-in portion a ledge 241 and guide walls 241' for guiding initial insertion of the clip 204 through the clip opening 240. For example, and referring to FIGS. 10 and 12, to attach the clip 204 to the housing cover 230, a user may insert the free end 222 of the lower arm 212 between the guide walls 241', through the clip opening 240, and into a receptacle such as a channel or guide slot 234 of the housing cover 230. The guide slot 234 has a longitudinal axis 235 along which the lower arm 212 of the clip 204 is inserted or removed. The housing cover 230 may include one or more side guide walls 233 for guiding insertion of the lower arm 212. In one approach, a lateral distance between opposite side guide walls 233 is greater than a lateral width of the lower arm 212. In this way, the lower arm 212 may slide longitudinally along axis 235 with "play" along each lateral side of the lower arm 212 to reduce friction between the side guide walls 233 and the lower arm 212. The housing cover 230 may also include lower support surfaces 236 for supporting the lower arm 212 thereon when the lower arm 212 is received in the guide slot 234. When fully inserted, the free end 222 of the lower arm 212 abuts a surface such as stop 238 of the housing cover 230.

Also when the lower arm 212 is fully inserted, the lower arm 212 may cooperate with the housing cover 230 to form a releasable lock or detent 253 that resists relative axial movement therebetween. For example, the lower arm 212 includes indents 245 formed in opposite side portions 247 of the lower arm 212. The housing cover 230 (as shown through the partial cross-section indicated at "251" in FIG. 12) includes one or more cam projections 253 that protrude from the side guide walls 233. As the lower arm 212 is inserted, the cam projections 253 engage the free end 222 of the lower arm 212 to generally center the free end 222 between the side guide walls 233. With the lower arm 212 fully inserted within the guide slot 234, the cam projections 253 engage the lower arm 212 at the indents 245 of the side portions 247 to resist axial movement (e.g., a "pull-out" movement) of the clip 204.

In this way, the housing cover 230 forms a guide slot 234 having a length (e.g., in the X direction) between the stop 238 and the clip opening 240, and a height (e.g., in the Z direction) between the lower support surfaces 236 and an upper wall portion 237 of the housing cover 230. The height and length of the guide slot 234 are slightly larger than the thickness and length, respectively, of the lower arm 212 such that the lower arm 212 is snuggly received in the light module body 202 when the clip 204 is removably secured or attached thereto.

The housing cover 230 further includes an access port or opening 242 that is generally aligned with the battery charging interface 108 in the Z direction for permitting access to the battery charging interface 108. For example, the access opening may be aligned with the battery charging interface along axis 243 that may be orthogonal to and/or intersect longitudinal axis 235.

When the clip 204 is assembled with the light module body 202, the lower arm 212 extends across the access opening 242 between the housing cover 230 and the battery charging interface 108 to cover and block access to the battery charging interface 108. In this way, when the light module 200 is assembled, liquids and debris are blocked from passing through the access opening 242 and into the light module body 202 to avoid fouling the battery charging interface 108 in the lower housing 60.

Referring to FIG. 12, a user may detach the clip 204 from the light module body 202 to access the battery charging interface 108. For example, a user may slide the clip 204 out of the guide slot 234 of the housing cover 220 until the free end 222 of the lower arm 212 has cleared the access opening 242 or has been removed from the clip opening 240 entirely. With the clip 204 removed, the battery charging interface

108 is exposed through the access opening 242 such that a user may insert a charging plug through the access opening 242 to electrically connect it to the battery charging interface 108 to charge the power source 54 of the light module body 202.

Figure 13:
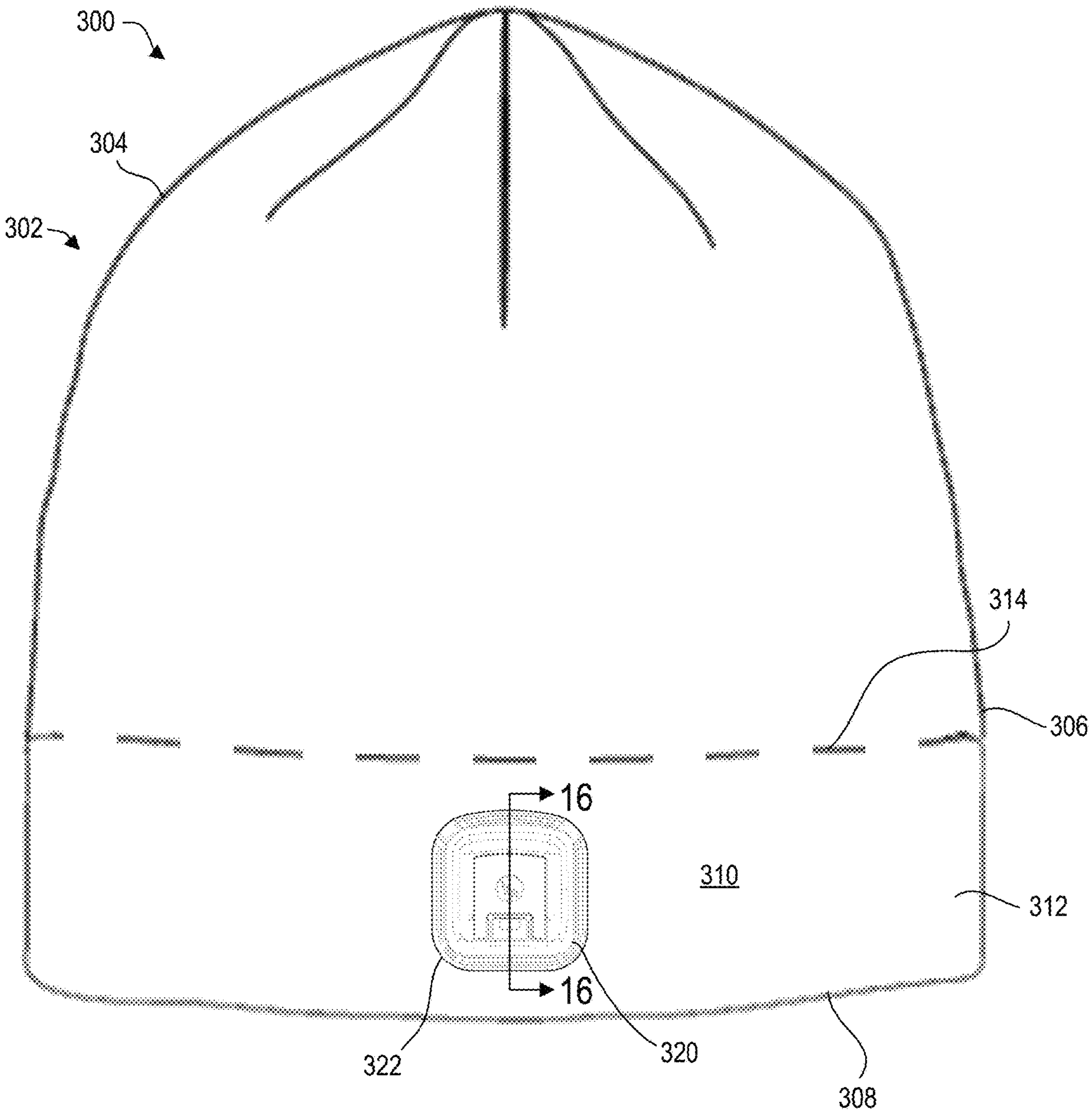
FIG. 13 is a front elevation view a beanie-style lighted cap having a self-contained light module removably secured to a resilient mount secured to the cap to provide illumination generally forwardly and downwardly from the cap.

Referring to FIG. 13, lighted headgear such as a lighted cap 300 is shown. The lighted cap 300 is in the form of a knit cap, which may be referred to as a beanie. The lighted cap 300 has a head-fitting portion 302 that includes a crown portion 304, which may be referred to as a tapering portion, and an annular portion 306 that extends below the crown portion 304 when worn on a head of a user to a lower edge 308. The lighted cap 300 includes a forwardly-facing surface 310 when worn. In one approach, the lighted cap 300 includes a cap band 312 disposed at a lower region of the annular portion 306. The cap band 312 may be a dual-layer portion of the lighted cap 300 that extends upwardly from the lower edge 308 to a seam 314 that encloses the cap band 312.

The lighted cap 300 includes a light module 320 and a mount 322 that secures the light module 320 to the lighted cap 300. The mount 322 is disposed at the forwardly-facing surface 310. With the light module 320 secured to the mount 322, the light module 320 may be actuated to emit light in a generally forward and downward direction from the lighted cap 300.

Figure 14:
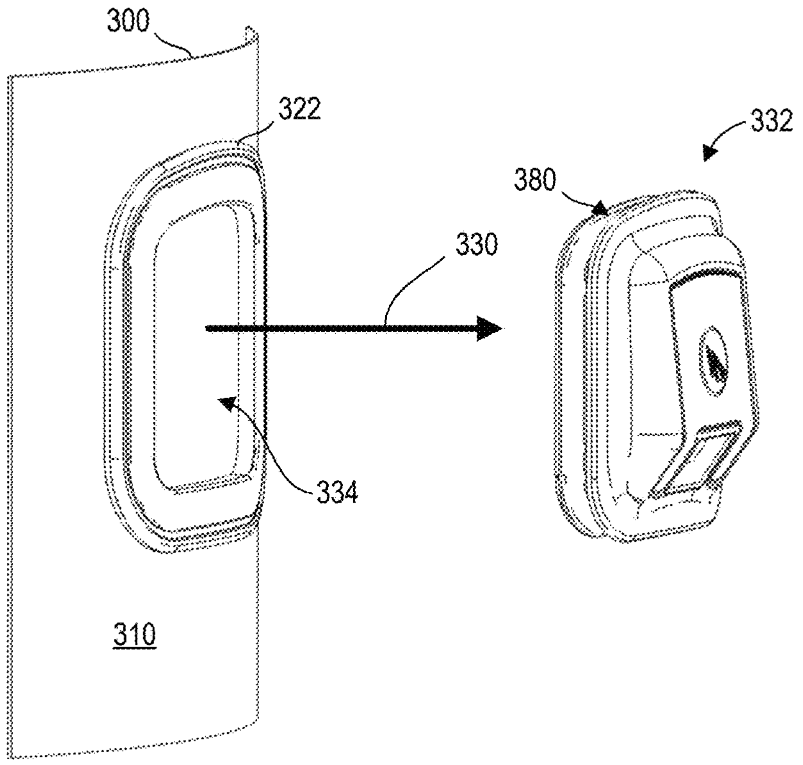
FIG. 14 is a front perspective view of the light module removed from the mount.
Figure 15:
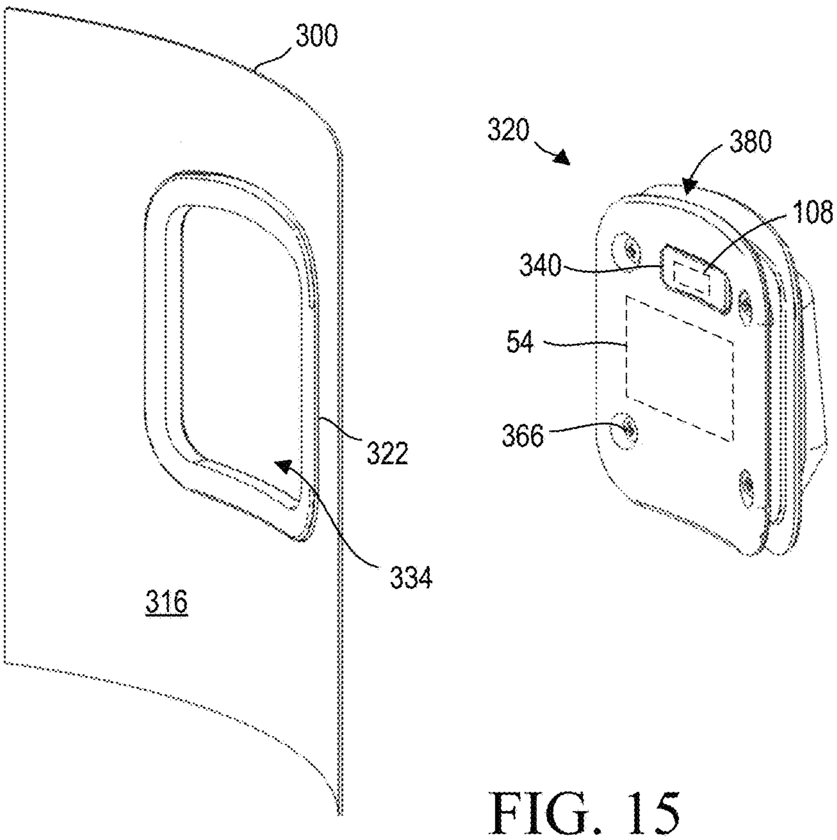
FIG. 15 is a rear perspective view of the light module removed from the mount and showing a resilient port cover in a covering orientation blocking access to a battery charging interface for charging the light module.

Referring to FIGS. 14 and 15, the light module 320 can be removed from the lighted cap 300. For example, a user may push the light module 320 outwardly of an opening 334 of the mount 322, as indicated at 330, such that the mount 322 is released from a groove 380 of the light module 320, as discussed in greater detail below. With the light module 320 removed from the lighted cap 300, a user may remove a port cover 340 to access a battery charging interface 108 and charge a power source 54 of the light module 320, as also discussed in greater detail below.

Figure 16:
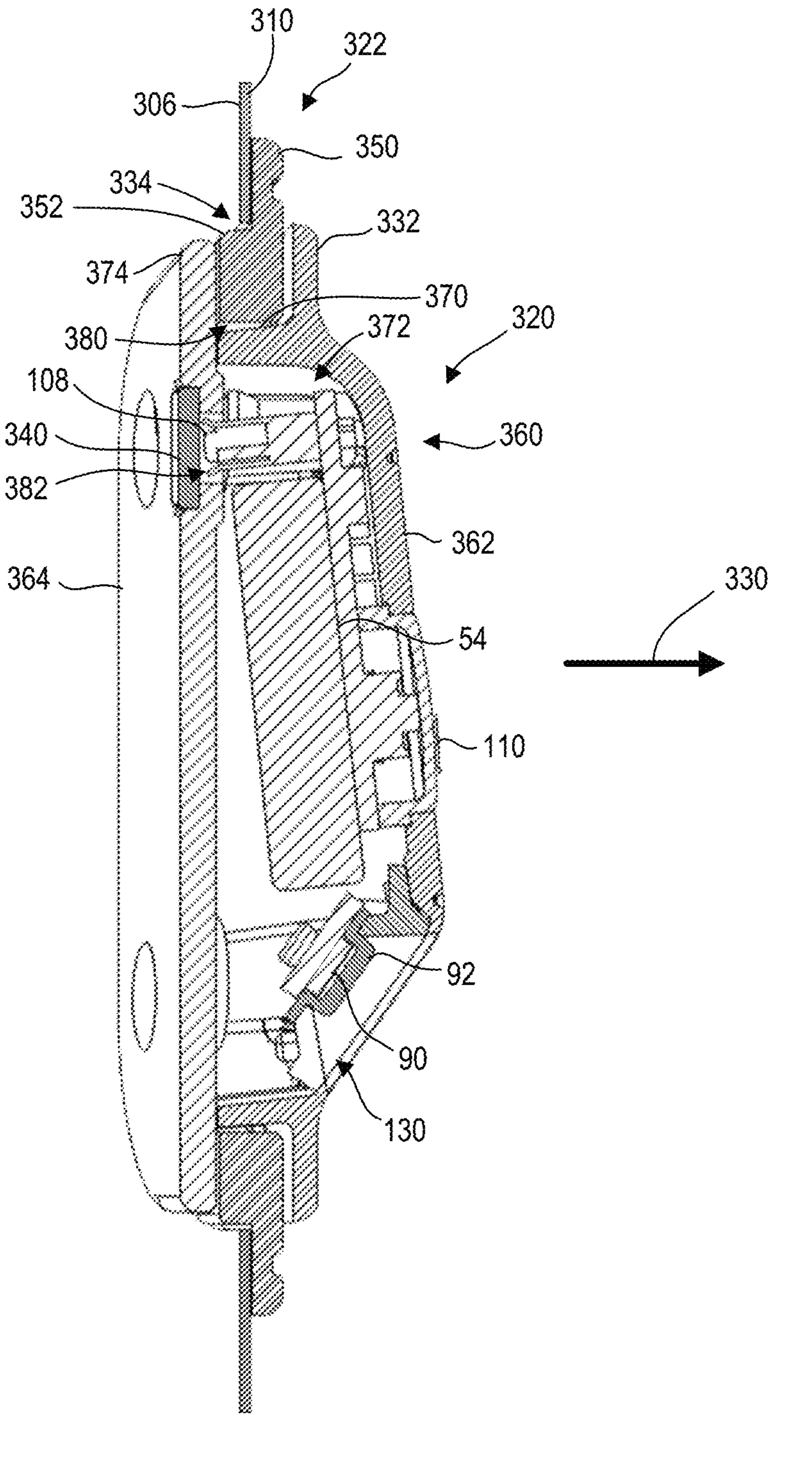
FIG. 16 is a cross-sectional elevation view taken along the line 16-16 of FIG. 13 showing the light module removably secured to the resilient mount with the resilient mount removably captured between forward and rearward flange portions of the light module.

Referring to FIG. 16, the mount 322 includes an outer overlap portion 350 that overlaps and is secured to the lighted cap 300 at the forwardly-facing surface 310; for example, via adhesive, heat sealing, fastener, etc. The mount 322 further includes an inner rim or retention portion 352 that retains the light module 320.

The light module 320 includes a housing 360 that may include an outer or externally-facing housing portion 362 and an inner or internally-facing housing portion 364. The outer housing portion 362 and inner housing portion 364 may be formed of similar or dissimilar materials. The inner housing portion 364 may be secured to the outer housing portion 362, for example, by one or more fasteners 366 (see FIG. 15). The housing 360 houses many of the same features as the light module 50 of FIGS. 1-7. As such, common parts are referred to with like reference numerals. For example, the housing 360 houses a power source 54, a light source 90, a battery charging interface 108, and other components such as those discussed with respect to the light module 50 of FIGS. 1-7.

The outer housing portion 362 includes a peripheral wall portion 370 that extends about the interior 372 of the outer housing portion 362. A forward flange 332 extends outwardly away from the peripheral wall portion 370. The inner housing portion 364 extends across the interior 372 of the outer housing portion 362 and outwardly beyond the peripheral wall portion 370. In this way, a rear flange 374 of the inner housing portion 364 cooperates with the forward flange 332 and the peripheral wall portion 370 to form a groove 380 for receiving a portion of the mount 322 (e.g., inner retention portion 352) therebetween to secure the light module 320 to the mount 322.

In one approach, the light module 320 forms a fluid-tight or substantially fluid-tight seal with the mount 322 when installed with the mount 322 (e.g., sufficient to comply with Ingress Protection (IP) rating of IP 67). For example, the interlock between the inner retention portion 352 of the mount 322 and the inner housing portion 364 and forward flange 332 of the light module 320 may form a watertight seal.

The mount 322 may be formed of a generally flexible material that is capable of flexing when a user presses the light module 320 in the direction indicated by arrow 330. Thus, to remove the light module 320 from the mount 322, a user can press the light module 320 in direction 330 to cause the mount 322 to flex and allow the rear flange 374 of the inner housing portion 364 to bypass the rear flange 374 to release the light module 320 from the mount 322.

A user may desire to detach the light module 320 the mount 322, for example, to recharge or replace a power source 54 of the light module 320. The light module 320 is provided with an opening 382 that is generally aligned with the battery charging interface 108. For example, the opening 382 may extend through the inner housing portion 364 of the housing 360 adjacent the battery charging interface 108. A port cover 340 extends over the opening 382 to protect the battery charging interface 108 and other internal components of the light module 320 from moisture or debris. When a user desires to charge the light module 320, the port cover 340 may be moved or removed to expose the battery charging interface 108.

To install or reinstall the light module 320, a user may work a portion of the mount 322 into the groove 380 of the light module 320. The user may continue to work other portions of the mount 322 into the groove 380 until the mount 322 is fully received in the groove 380 about the entire periphery of the light module 320. With the light module 320 removably installed on the mount 322, the forward flange 332 and the rear flange 374 of the light module 320 cooperate with the mount 322 to maintain the light module 320 on the lighted cap 300.

Figure 17:
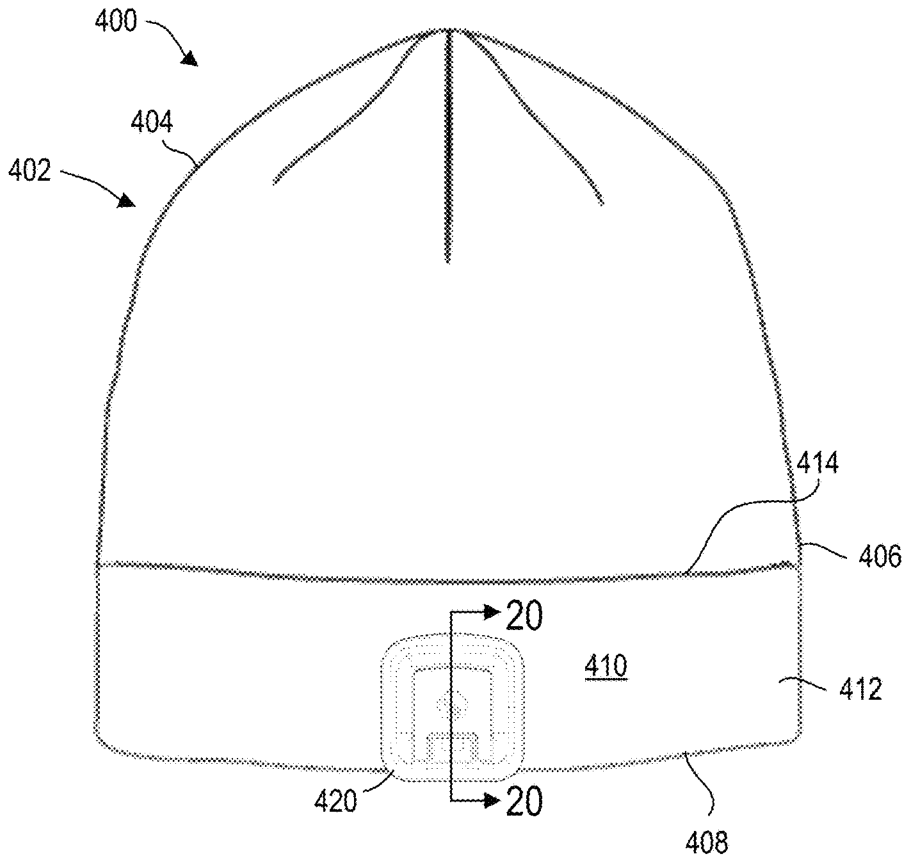
FIG. 17 is a front elevation view a beanie-style cap having a self-contained removable light module removably secured about a lower folded edge of a folded band of the cap to provide illumination generally forwardly and downwardly from the cap.

Referring to FIG. 17, a light module 420 for headgear such as a cap 400 is shown. The cap 400 is in the form of a knit cap, which may be referred to as a beanie. The cap 400 has a head-fitting portion 402 that includes a crown portion 404, which may be referred to as a tapering portion, and an annular portion 406 that extends below the crown portion 404 when worn on a head of a user to a lower edge 408. The lighted cap 400 includes a forwardly-facing surface 410 when worn. In one approach, the lighted cap 400 includes a cap band 412 disposed at a lower region of the annular portion 406. The cap band 412 may be a folded over portion of the lighted cap 400 that extends upwardly from the lower edge 408 to an upper band edge 414 of the cap band 412. In this approach, the cap band 412 forms the forwardly-facing surface 410.

The lighted cap 400 includes a light module 420 securable to the cap 400 at the forwardly-facing surface 410. As described in greater detail below, the light module 420 may be configured to be secured to the lower edge 408 of the cap band 412 or to the upper band edge 414 of the cap band 412. In either configuration, the light module 420 may be actuated to emit light in a generally forward and downward direction from the forwardly-facing surface 410 of the lighted cap 400.

Figure 18:
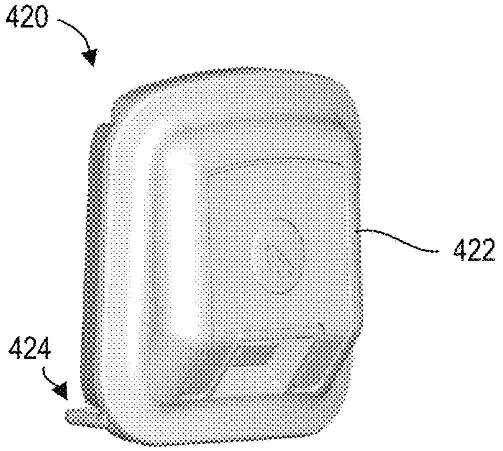
FIG. 18 is a front perspective view of the self-contained removable light module of FIG. 17 removed from the cap.
Figure 19:
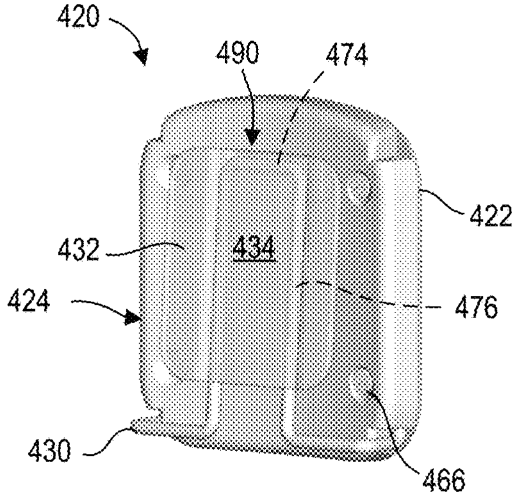
FIG. 19 is a rear perspective view of the self-contained removable light module of FIG. 17 showing a pad portion of the mount in partial transparency to show an internal portion of the clip portion of the mount and with the mount oriented to open upwardly so that the mount can extend about the lower folded edge of the band.

Referring to FIGS. 18 and 19, the light module 420 includes a light module body 422 and an attachment member such as a clip 424. The clip 424 includes a resilient arm portion 430 that may be in the form of a wire prong, and a pad portion 432 secured to the arm portion 430. To install the light module 420 on a lighted cap 400, the arm portion 430 may be flexed away from the light module body 422 a sufficient distance to permit a portion of the lighted cap 400 (e.g., annular portion 406) to fit between the clip 424 and the light module body 422. When installed, the arm portion 430 presses the annular portion 406 against the light module body 422 to maintain the light module 420 on the lighted cap 400. When the lighted cap 400 is worn, an inwardly-facing wall portion 434 of the pad portion 432 may rest against the forehead of a user.

Figure 20:
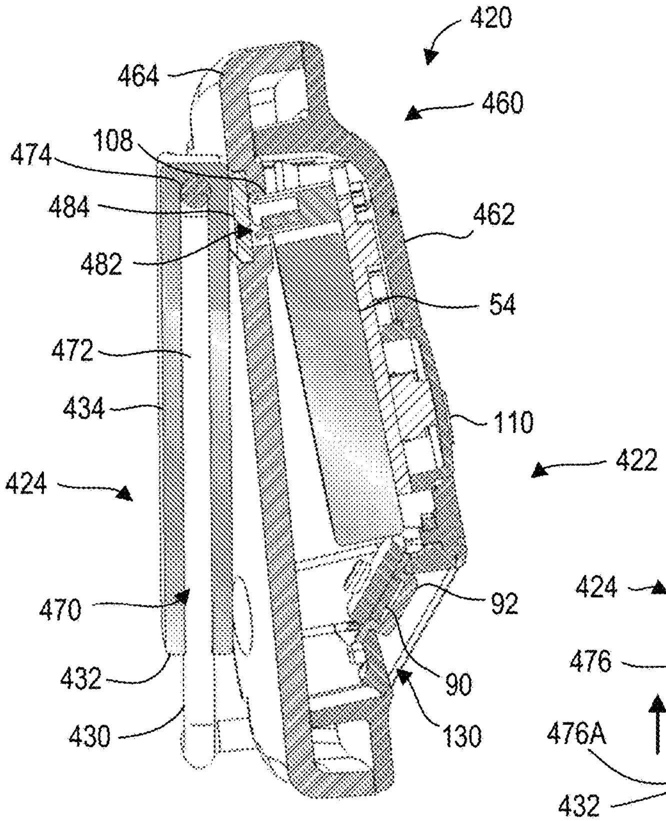
FIG. 20 is a cross-sectional elevation view taken along the line 20-20 of FIG. 17 showing the mount removably secured to the light module with an arm portion of the mount received within an opening of the light module.
Figure 21:
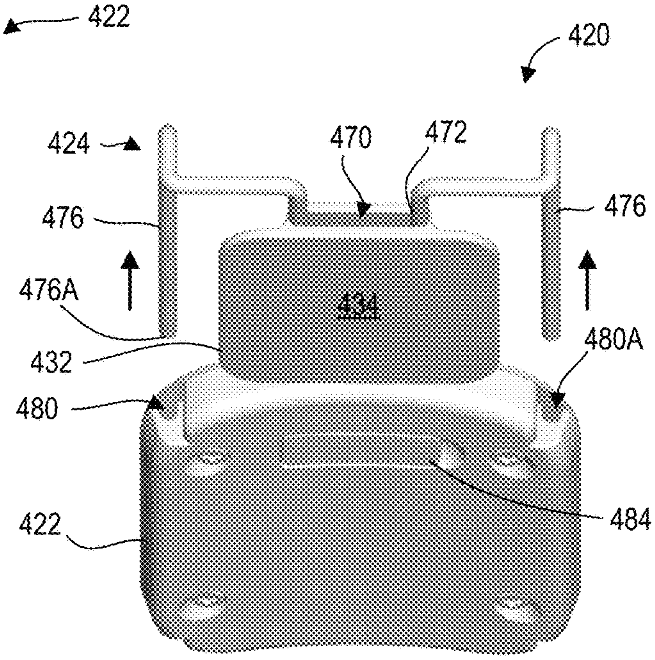
FIG. 21 is an upper perspective view of the light module showing the mount removed from openings at an upper portion of the light module body.

Referring to FIG. 20, the light module body 422 includes a housing 460 that may be a housing assembly including an outer or externally-facing housing portion 462 and an inner or internally-facing housing portion 464. The outer housing portion 462 and inner housing portion 464 may be formed of similar or dissimilar materials. The inner housing portion 464 may be secured to the outer housing portion 462, for example, by one or more fasteners 466 (see FIG. 19). The housing 460 houses many of the same features as the light module 50 of FIGS. 1-7. As such, common parts are referred to with like reference numerals. For example, the housing 460 houses a power source 54, a light source 90, a battery charging interface 108, and other components such as those discussed with respect to the light module 50 of FIGS. 1-7.

Referring to FIGS. 19-22, the pad portion 432 includes a channel or slot 470 extending therein for receiving the arm portion 430. The arm portion 430 includes inner extension legs 472 that extend into and are secured within the slot 470 of the pad portion 432, and a central or intermediate portion 474 that extends between the extension legs 472.

Figure 22:
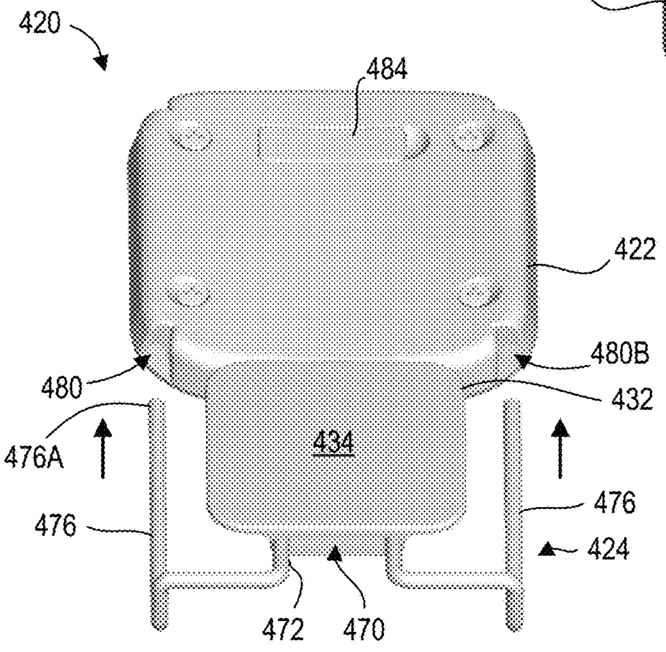
FIG. 22 is a lower perspective view of the mount before being inserted in through openings via openings at a lower portion of the light module body.

The arm portion 430 further includes outer anchor legs 476 that are securable to the light module body 422. For example, the anchor legs 476 are sized to be received within slots or holes 480 of the light module body 422. Each hole 480 may be a through-hole that extends through the housing 460 of the light module body 422 from a first hole opening 480A (FIG. 21) to a second hole opening 480B (FIG. 22).

Figure 23:
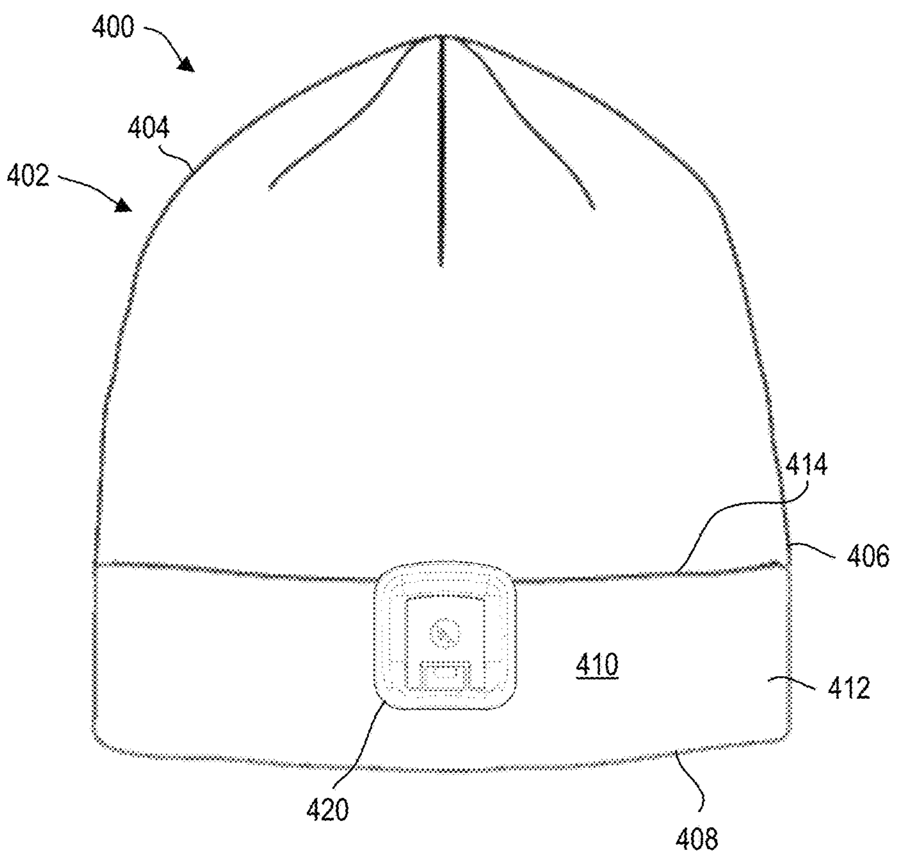
FIG. 23 is a front elevation view of a beanie-style cap having a self-contained removable light module removably secured at an upper edge of the folded band portion of the cap to provide illumination generally forwardly and downwardly from the cap.
Figure 24:
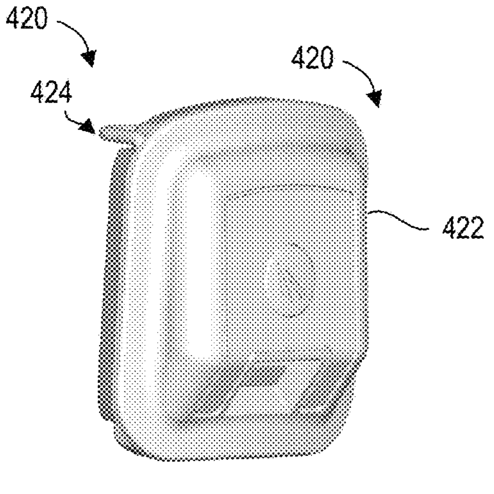
FIG. 24 is a front perspective view of the self-contained removable light module of FIG. 23 removed from the cap.
Figure 25:
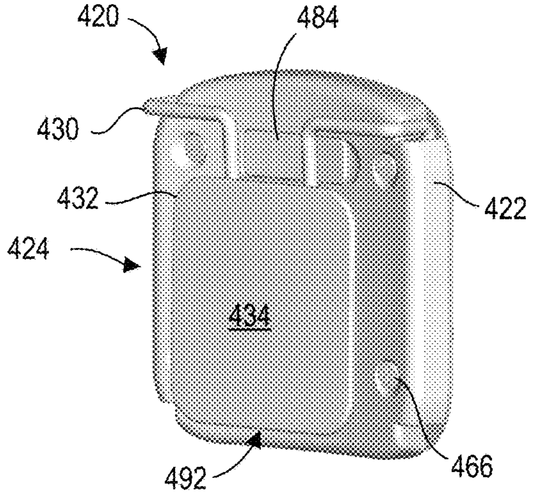
FIG. 25 is a rear perspective view of the self-contained removable light module of FIG. 23 with the mount oriented to open downwardly so that the mount can extend about the folded band upper edge.
Figure 26:
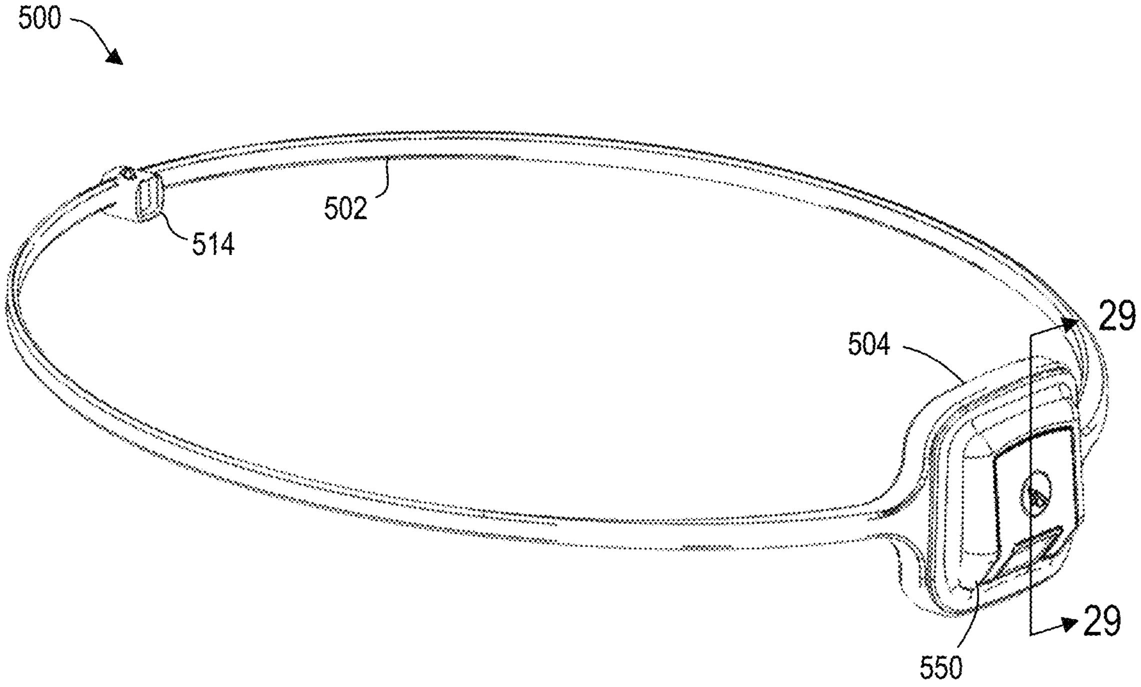
FIG. 26 is a front perspective view of a headband having a self-contained removable light module removably secured to an enlarged, resilient mounting portion of the head band.

In the approach shown in FIG. 17-20, terminal ends 476A of the anchor legs 476 extend through the first hole openings 480A to secure the clip 424 to the light module body 422. This approach forms an upper clip or attachment slot 490 of the light module 420 that the permits a user to install the light module 420 in an upward direction on an article of clothing such as the lower edge 408 of the cap 400. In another approach, shown in FIGS. 23-25, a user may desire to install the light module 420 in a downward direction; for example, to an upper band edge 414 of a folded-up cap band 412. In either of these approaches, the light module 420 is installed to direct light downwardly and forwardly of the user. In still another approach, the light module 420 may be installed to direct light upwardly and forwardly of the user.

In this way, the light module 420 may be reconfigurable to flip the orientation of the clip 424 relative to the light module body 422. More particularly, and referring to FIGS. 21 and 22, the clip 424 may be removed from the light module body 422 such that the terminal ends 476A of the anchor legs 476 clear the first hole openings 480A. Either of the light module body 422 or the clip 424 may be rotated 180 relative to the other such that the terminal ends 476A of the anchor legs 476 may be inserted into the second hole openings 480B of the light module body 422. The resulting orientation, shown in FIGS. 23-25, forms a lower clip or attachment slot 492 of the light module 420 that permits the user to attach the light module 420 downwardly to an upper band edge 414 of a folded-up cap band 412.

As previously described, the light module 420 includes a power source 54 such as a rechargeable and a battery charging interface 108 for recharging the battery. The light module 420 is provided with an opening 482 that is generally aligned with the battery charging interface 108. For example, the opening 482 may extend through the inner housing portion 464 of the housing 460 adjacent the battery charging interface 108. A port cover 484 extends over the opening 482 to protect the battery charging interface 108 and other internal components of the light module 420 from moisture or debris. When a user desires to charge the light module 420, the clip 424 may be removed from the light module body 422, and the port cover 484 may be moved or removed to expose the battery charging interface 108.

Figure 29:
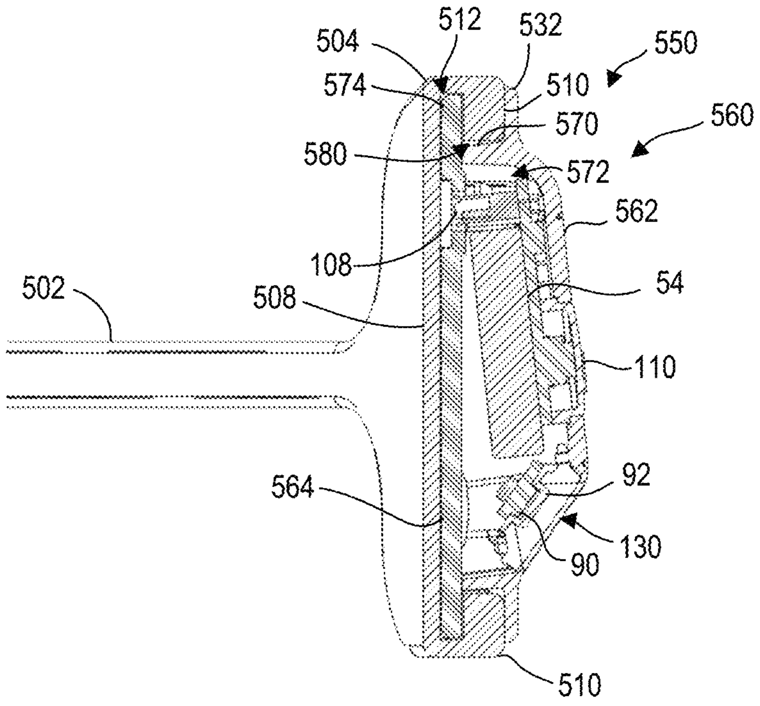
FIG. 29 is a cross-sectional elevation view taken along the line 29-29 of FIG. 26 showing the light module removably secured to the mounting portion with a rim portion thereof captured in a groove between forward and rearward flange portions of the light module.
Figure 30:
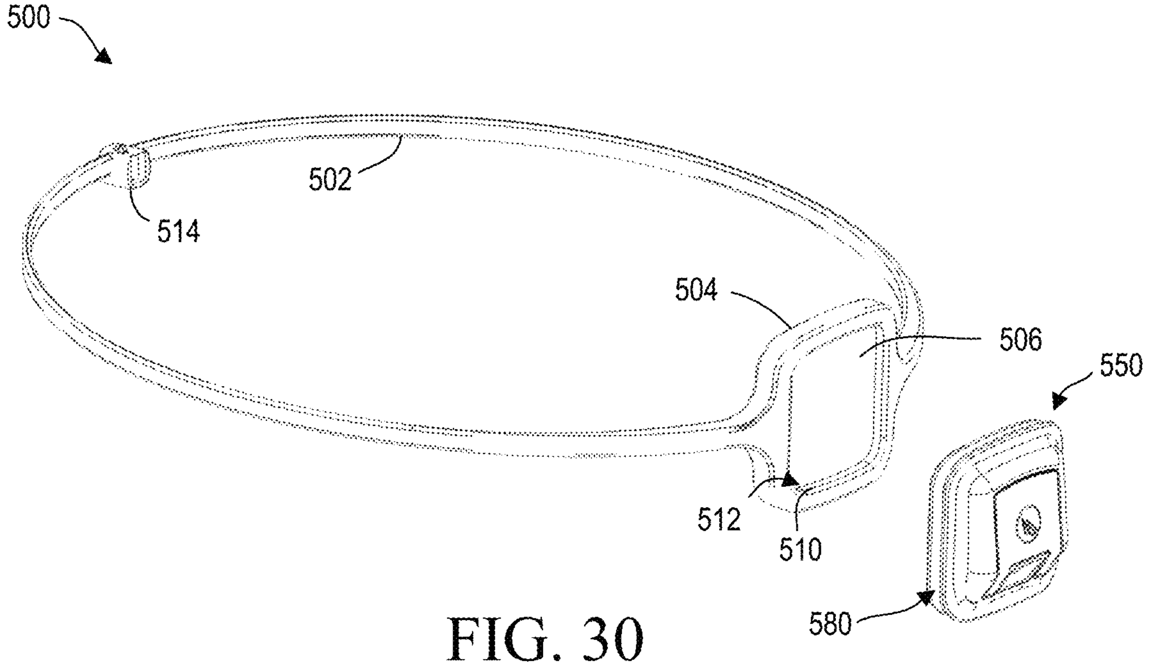
FIG. 30 is a front perspective view of a headband showing the light module removed from the mounting portion and exposing a recessed cavity thereof sized for removably receiving a rear wall of the light module therein.
Figure 31:
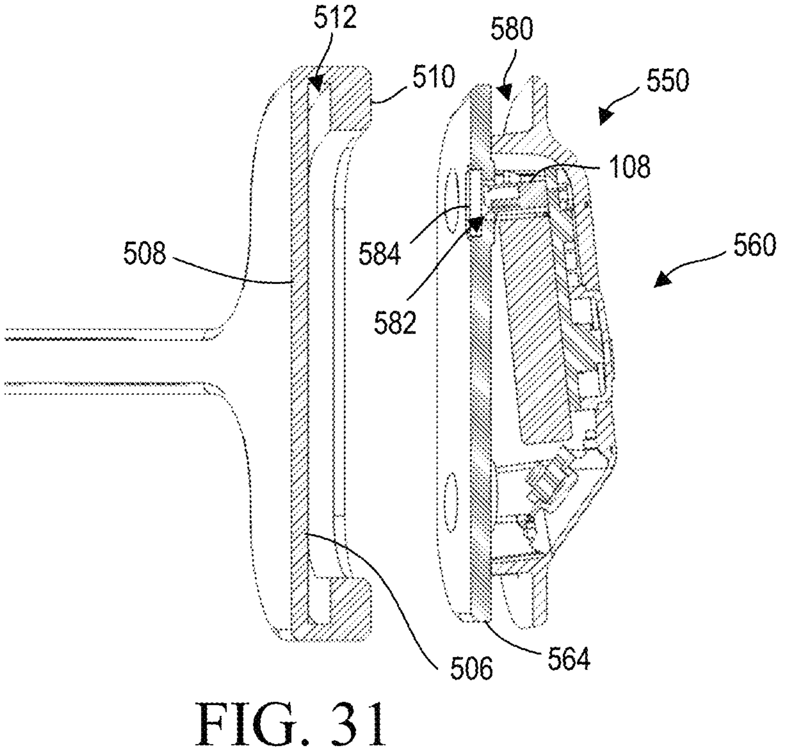
FIG. 31 is a cross-sectional elevation view similar to FIG. 29 showing the light module detached from the mounting portion.

Referring to FIGS. 26-31, lighted headgear such as a headlamp 500 is shown. The headlamp 500 has a headband or head-fitting portion 502 that may be in the form of a flexible band. The headlamp 500 also includes a mounting portion 504 that may be integrally formed with the head-fitting portion 502 such that the mounting portion 504 and head-fitting portion 502 form a unitary (single-piece) construction therewith. The mounting portion 504 and head-fitting portion 502 may be formed, for example, of silicone. The mounting portion 504 that includes a forwardly-facing surface 506 (FIGS. 30 and 31) and a rearwardly-facing surface 508 that is supported along a user's forehead when worn. As shown in FIGS. 29 and 31, the mounting portion 504 includes a generally inwardly-extending rim portion 510 that forms a groove 512 of the mounting portion 504 for retaining a light module 550, as described in greater detail below. The headlamp 500 is provided with an adjustment mechanism 514 to adjust the tension of the head-fitting portion 502 when worn. For example, a portion of the head-fitting portion 502 may be pulled through an opening 516 (FIG. 27) of the adjustment mechanism 514 to increase tension in the head-fitting portion 502.

Figure 27:
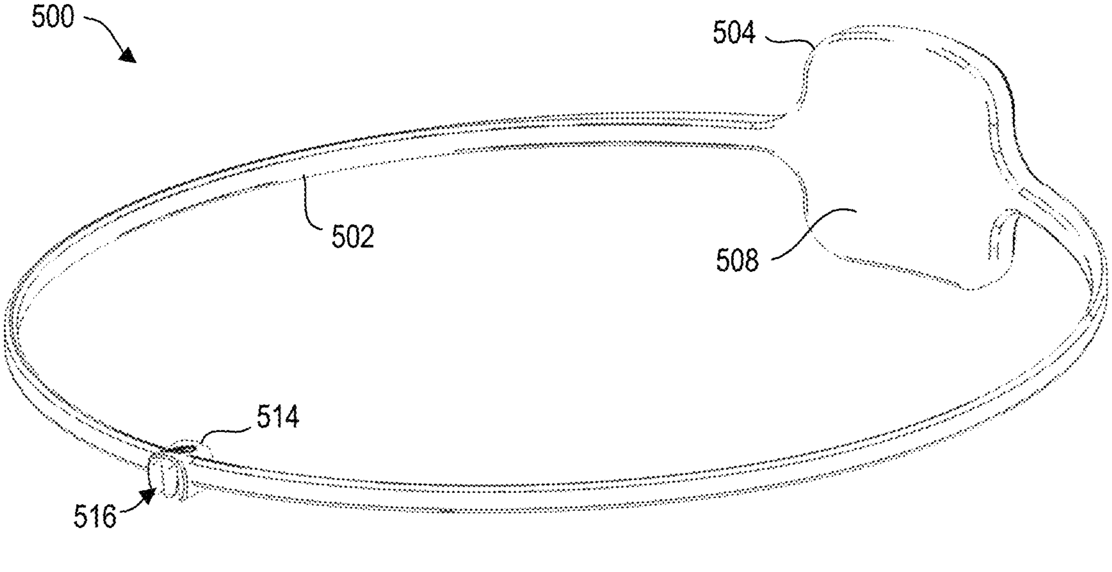
FIG. 27 is a rear perspective view of the headband of FIG. 26.
Figure 28:
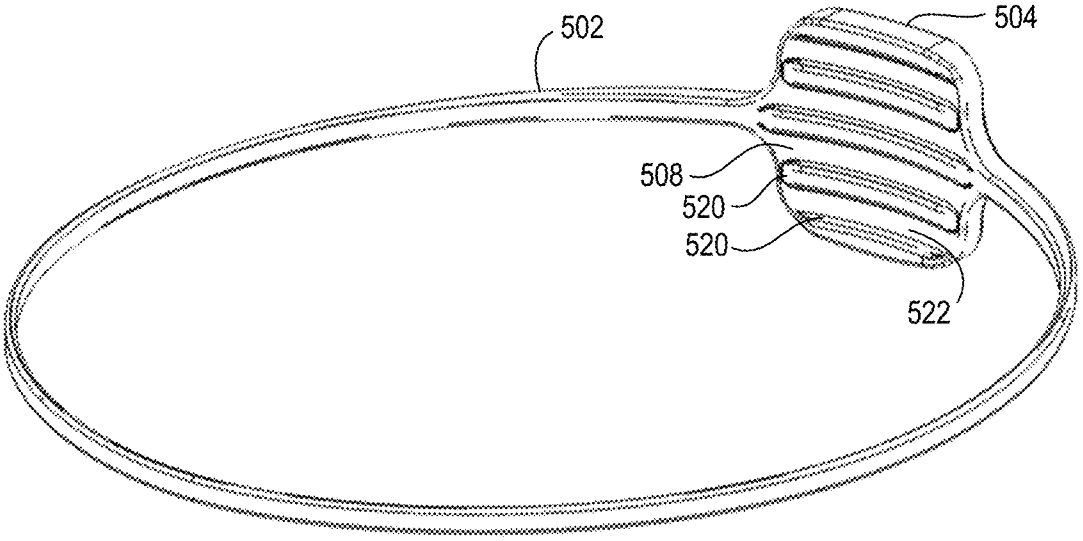
FIG. 28 is a rear perspective view of an alternative headband having ribs extending along the rear surface of the mounting portion.

In the approach shown in FIG. 27, the rearwardly-facing surface 508 includes a generally smooth surface. In other approaches, such as the approach shown in FIG. 28, the rearwardly-facing surface 508 includes one or more discontinuities such as raised ribs 520 that form gaps or channels 522 therebetween. In this approach, when the mounting portion 504 is pressed against a user's forehead, the ribs 520 permit air circulation through the channels 522, which may improve comfort by promoting airflow along the rearwardly-facing surface 508 and channeling perspiration away from the rearwardly-facing surface 508. Other surface discontinuities such as bumps or ridges may be provided to create spacing between the rearwardly-facing surface 508 and a user's skin.

The headlamp 500 further includes a light module 550 that includes a housing 560. The housing 560 may include an outer or externally-facing housing portion 562 and an inner or internally-facing housing portion 564. The outer housing portion 562 and inner housing portion 564 may be formed of similar or dissimilar materials. The housing 560 houses many of the same features as the light module 50 of FIGS. 1-7. As such, common parts are referred to with like reference numerals. For example, the housing 560 houses a power source 54, a light source 90, a battery charging interface 108, and other components such as those discussed with respect to the light module 50 of FIGS. 1-7.

The outer housing portion 562 includes a peripheral wall portion 570 that extends about the interior 572 of the outer housing portion 562. A flange 532 of the outer housing portion 562 extends outwardly away from the peripheral wall portion 570. The inner housing portion 564 extends across the interior 572 of the outer housing portion 562 and outwardly beyond the peripheral wall portion 570. In this way, the periphery of the inner housing portion 564, as indicated at 574, cooperates with the flange 532 and the peripheral wall portion 570 to form a groove 580 for receiving a rim portion 510 of the mounting portion 504 therebetween to secure the light module 550 to the mounting portion 504.

The mounting portion 504 is formed of a material that is more flexible than the inner housing portion 564 and that is capable of flexing when a user pulls the light module 550 away from the mounting portion 504. Thus, to remove the light module 550 from the mounting portion 504, a user can pull the light module away 550 from the mounting portion 504, causing the rim portion 510 to flex a sufficient amount out of the groove 580 to release the periphery 574 of the inner housing portion 564 and free the light module 550, as shown in FIG. 30.

To install or reinstall the light module 550, a user may work a portion of the rim portion 510 of the mounting portion 504 into the groove 580 of the light module 550. The user may continue to work other portions of the rim portion 510 into the groove 580 until the rim portion 510 is fully received in the groove 580 about the entire periphery of the light module 550. With the light module 550 removably installed on the mounting portion 504, the flange 532 and the inner housing portion 564 of the light module 550 cooperate with the rim portion 510 to maintain the light module 550 on the headlamp 500.

As previously described, the light module 550 includes a power source 54 such as a rechargeable and a battery charging interface 108 for recharging the battery. With reference to FIG. 31, the light module 550 is provided with an opening 582 that is generally aligned with the battery charging interface 108. For example, the opening 582 may extend through the inner housing portion 564 of the housing 560 adjacent the battery charging interface 108. A port cover 584 extends over the opening 582 to protect the battery charging interface 108 and other internal components of the light module 550 from moisture or debris. When a user desires to charge the light module 550, the port cover 584 may be moved or removed to expose the battery charging interface 108.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments are combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics is compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and is desirable for particular applications.

What is claimed is:

1. Lighted headgear comprising:

a head-fitting portion for fitting on a head of a user, the head-fitting portion having a forwardly-facing surface when worn;

a mount member of the head-fitting portion including an outer overlap portion secured to the head fitting portion, an inner rim portion extending from and contiguously with the outer overlap portion in an inward direction to an inner edge thereof at which the inner rim portion terminates, and an inner opening about which the inner edge of the rim portion extends, with the inward direction extending from the outer overlap portion toward a center of the inner opening; and a self-contained light module removably securable to the mount member, the light module including a light source, a housing having the light source mounted to be fixed relative to the housing, a rechargeable battery in the housing, and a battery charging interface at least partially in the housing, the housing having a peripheral channel to allow the housing to be received within the inner opening with the rim portion including the inner edge thereof received within the peripheral channel to secure the light module to the mount member.

2. The lighted headgear of claim 1 wherein the housing includes a forward peripheral flange and a rearward peripheral flange that form the peripheral channel therebetween.

3. The lighted headgear of claim 2 wherein in an installed configuration, the light module receives the rim portion within the peripheral channel between the forward peripheral flange and the rearward peripheral flange.

4. The lighted headgear of claim 2 wherein the rim portion includes a flexible portion that flexes as the light module is moved into and out of the inner opening.

5. The lighted headgear of claim 1 wherein the head-fitting portion includes an annular portion and a tapered crown portion, and wherein the mount member is fixedly secured at the forwardly-facing surface of the annular portion.

6. The lighted headgear of claim 2 wherein, with the light module removably secured to the mount member, the forward peripheral flange is entirely forward of the forwardly-facing surface of the head-fitting portion.

* * * * *